(12) United States Patent
Rehman et al.

(10) Patent No.: US 8,893,197 B2
(45) Date of Patent: Nov. 18, 2014

(54) LICENSED AND UNLICENSED SPECTRUM SET-TOP BOX

(71) Applicant: CenturyLink Intellectual Property LLC, Denver, CO (US)

(72) Inventors: Misbah ur Rehman, Highlands Ranch, CO (US); Steven M. Casey, Littleton, CO (US); Kevin M. McBride, Lone Tree, CO (US); Felipe Castro, Erie, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 13/829,112

(22) Filed: Mar. 14, 2013

(65) Prior Publication Data

US 2014/0282754 A1  Sep. 18, 2014

(51) Int. Cl.
*H04N 7/173*  (2011.01)
*H04N 21/61*  (2011.01)

(52) U.S. Cl.
CPC ..................................... *H04N 21/61* (2013.01)
USPC ................ 725/95; 725/81; 725/100; 725/116

(58) Field of Classification Search
USPC .............. 725/81, 95, 116, 148, 126, 100, 131
See application file for complete search history.

(56) References Cited

U.S. PATENT DOCUMENTS

| | | | |
|---|---|---|---|
| 2010/0313236 A1* | 12/2010 | Straub ........................... | 725/146 |
| 2011/0083154 A1* | 4/2011 | Boersma ....................... | 725/109 |
| 2011/0228666 A1* | 9/2011 | Barbieri et al. ................ | 370/216 |
| 2011/0296475 A1* | 12/2011 | Craner ............................ | 725/90 |

* cited by examiner

*Primary Examiner* — Nnenna Ekpo
(74) *Attorney, Agent, or Firm* — Swanson & Bratschun, L.L.C.

(57) ABSTRACT

Novel tools and techniques are described for providing media content to a plurality of set-top boxes ("STBs") over a licensed spectrum and over an unlicensed spectrum. In an aspect, each of the plurality of STBs might comprise a first transceiver configured to receive media content or data over a licensed spectrum and a second transceiver configured to receive and send media content or data over an unlicensed spectrum. The first STB of the plurality of STBs might receive a first portion of the media content at the first transceiver and receive a second portion of the media content at the second transceiver from a second STB of the plurality of STBs. The plurality of STBs might query each other to determine available frequencies and/or bandwidth, and might store results of the query in a table in local memory or in a database accessible by all of the plurality of STBs.

19 Claims, 18 Drawing Sheets

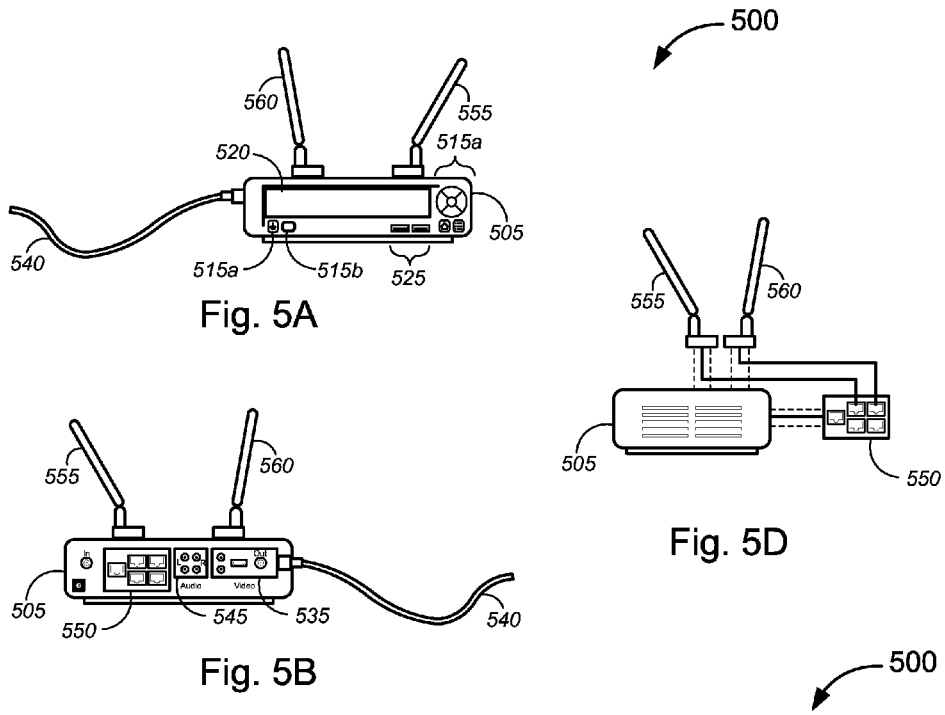
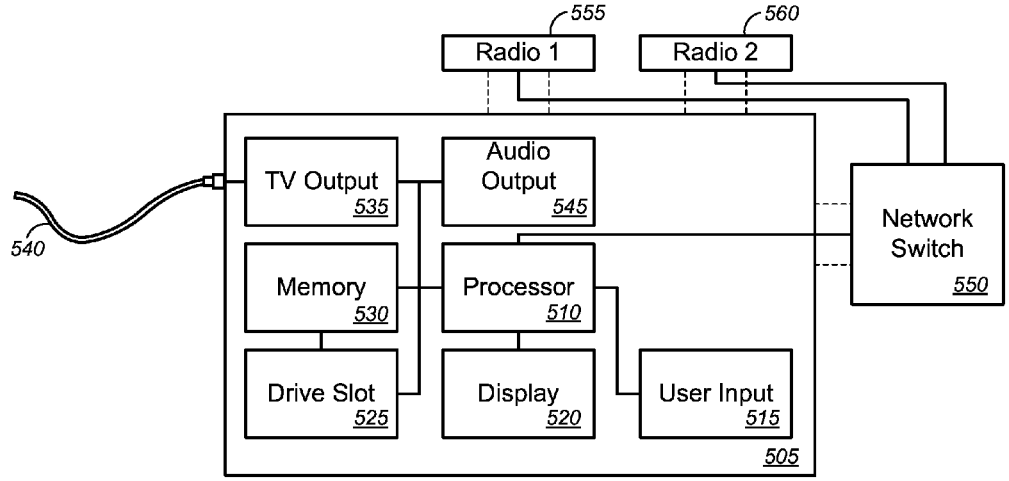

1000

LICENSED AND UNLICENSED SPECTRUM SET-TOP BOX

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a method, system, and apparatus associated with providing media content to set-top boxes, and, more particularly, to a method, system, and apparatus associated with providing media content to set-top boxes over both a licensed spectrum and an unlicensed spectrum.

BACKGROUND

Today, set-top boxes ("STBs") use WiFi for video distribution within the home, but such set-top boxes do not currently share bandwidth between set-top boxes. In addition, some STBs use a licensed spectrum with a gateway device to provide video content. However, these STBs have not been used with a combination of licensed and unlicensed spectrum to deliver video content from a combined device. With the advent of more STBs being deployed in the home, it will become more important to provide higher quality bandwidth.

The embodiments disclosed herein are directed toward overcoming one or more of the problems discussed above.

BRIEF SUMMARY

Various embodiments provide apparatuses, systems, and techniques to enable two or more set-top boxes that are within wireless range of each other to share bandwidth. In one aspect, sharing of bandwidth includes sharing over an unlicensed spectrum, with each STB in such a shared network utilizing a combination of licensed and unlicensed spectrum to deliver media content (including video content, audio content, or other media content) or data to a subscriber. In another aspect, the unlicensed spectrum may be shared between the two or more STBs in one home and/or between homes.

The various embodiments thus allow high bandwidth media content (including, but not limited to, high quality video signals, and the like) to be delivered to each subscriber, while making efficient use of un-provisioned frequencies and/or bandwidth available neighboring STBs.

According to some embodiments, an STB might comprise two radios, one for licensed spectrum and the other for unlicensed spectrum. The unlicensed spectrum might be shared in the home or between homes; in other words, a first STB and a second STB can be in the same home or in different homes. In this manner, one STB can be used to help one or more STBs that are within the frequency range, via the unlicensed spectrum. This allows the STB to use the extra un-provisioned frequencies for its needs and to release the extra un-provisioned frequencies when the needs are fulfilled.

The various embodiments may also be used for rain fade or other conditions that might impact the signal strength of signals being received by specific groups of set-top boxes.

In some embodiments, a plurality of STBs might query each other to determine available frequencies and/or bandwidth, and might store results of the query in a table in local memory or in a database accessible by all of the plurality of STBs. In some cases, the queries may be periodic, while in other cases, the queries may be in response to a determination that more bandwidth is required. Data pass-through may also be performed from one or many STBs to increase the bandwidth to one STB, as needed. According to some embodiments, one STB could link 1, 2, 3, or more STBs together to gather the frequencies/bandwidth it needs to fulfill the bandwidth required for a period of time.

In some embodiments, out-of-service locations could be covered with another set-top box that was close enough to carry the bandwidth to the home. An example of this is when a DSL line is down, one STB could connect to another STB near it to establish connectivity until the line is repaired. The other STB could provide either video or data services based on the data requests.

In an aspect, a system might be provided for providing media content to a plurality of set-top boxes over a licensed spectrum and over an unlicensed spectrum. The system might comprise a first set-top box ("STB") and a second STB of a plurality of STBs. Each of the plurality of STBs might comprise comprising a first transceiver configured to receive media content over the licensed spectrum and a second transceiver configured to send and receive media content over the unlicensed spectrum. The first STB, which might be located at a first customer premises from among one or more customer premises, might be configured to receive, at the first transceiver of the first STB, a first portion of media content over the licensed spectrum. The second STB might be configured to receive, at the first transceiver of the second STB, a second portion of the media content over the licensed spectrum. The second STB might be further configured to transmit, using the second transceiver of the second STB, the second portion of the media content to the second transceiver of the first STB over the unlicensed spectrum. The media content might include content selected from a group consisting of video content, audio content, and data.

In some embodiments, the system might further comprise a remote terminal located at a service provider, the remote terminal configured to transmit the media content over the licensed spectrum, wherein the first portion and the second portion of the media content are transmitted to the respective first and second STBs from the remote terminal over the licensed spectrum.

In another aspect, a method might be provided for providing media content to a plurality of set-top boxes over a licensed spectrum and over an unlicensed spectrum. The method might comprise receiving, by a first set-top box ("STB") of a plurality of STBs, a first portion of media content from a remote terminal located at a service provider. The first STB might be located at a first customer premises of one or more customer premises. Each of the plurality of STBs might comprise a first transceiver configured to receive media content over the licensed spectrum and a second transceiver configured to send and receive media content over the unlicensed spectrum. The first STB might receive the first portion of media content over the licensed spectrum using the first transceiver of the first STB.

The method might further comprise receiving, by the first STB, a second portion of the media content from a second STB of the plurality of STBs. The first STB might receive the second portion of media content using the second transceiver of the first STB over the unlicensed spectrum. The second STB might receive the second portion of media content from the remote terminal over the licensed spectrum, and might transmit the second portion of media content to the second transceiver of the first STB using the second transceiver of the second STB over the unlicensed spectrum.

In yet another aspect, a licensed and unlicensed spectrum set-top box might be provided. The licensed and unlicensed spectrum set-top box might comprise a first transceiver and a second transceiver. The first transceiver might be configured to receive media content over a licensed spectrum, while the second transceiver might be configured to receive media content over an unlicensed spectrum. In some embodiments, the licensed and unlicensed spectrum set-top box might further comprise a memory on which is stored a table of available bandwidth of a neighboring plurality of set-top boxes ("STBs"). The available bandwidth might comprise at least one of available frequency bandwidth, available network bandwidth, available data bandwidth, or available digital bandwidth.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 5A, 5B, and 5D are front, rear, and side views of an example of a modular licensed and unlicensed spectrum set-top box, in accordance with various embodiments.

FIG. 5C is a schematic diagram of the modular licensed and unlicensed spectrum set-top box of FIGS. 5A, 5B, and 5D, in accordance with various embodiments.

DETAILED DESCRIPTION OF CERTAIN EMBODIMENTS

Figure 1:
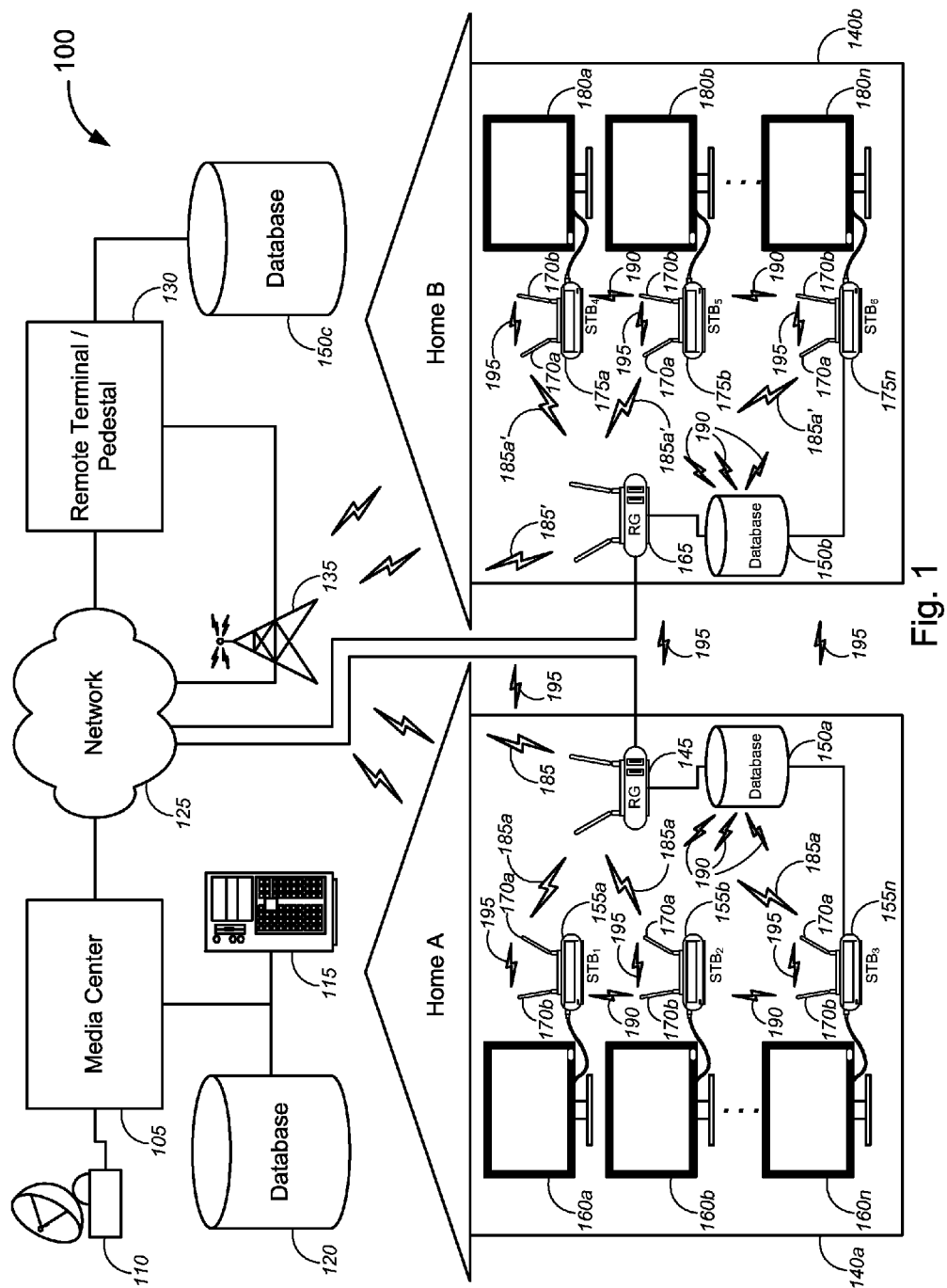
FIG. 1 is a general schematic diagram of a system for providing media content and/or data to a set-top box via a plurality of set-top boxes over both licensed and unlicensed spectrum, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "rain fade" might refer to absorption of microwave radio frequency ("RF") signals by atmospheric rain, snow or ice, and losses typically observed at frequency transmissions above 11 GHz, or might refer to signal degradation caused by electromagnetic interference of the leading edge of a storm front, both of which might occur at the uplink or downlink location, or anywhere through which the signal might pass.

Herein, the terms "available frequency" and "available bandwidth" might refer to either available frequency bandwidth or available network/data/digital bandwidth. For purposes of the disclosure herein, these terms are synonymous to refer to un-provisioned frequency bands or bit-rate channel capacity that are available for sharing signals and/or data packets amongst wireless STBs.

"ICC" as understood by those skilled in the art, might refer to instant channel change, which is a buffering technique used on channel changing servers that creates multiple unicast streams that are sent to the customer along with the broadcast multicast. In this manner, when the user requests a channel swap, switching to the buffered content can be performed immediately while proceeding with the new multicast request. Accordingly, as used herein, "ICC Overhead" might refer to the bandwidth overhead required for implementing the ICC technique.

Various aspects of the present disclosure are directed to utilizing extra and/or un-provisioned frequencies or bandwidth to fulfill bandwidth-intensive operations (including, without limitation, video streaming, high-definition video streaming, gaming, and/or the like). For example, some users may want to have more channels or higher video rates, but the services purchased might have limited bandwidth. Other neighboring or nearby subscribers might have unrealized available bandwidth. For example, a subscriber might purchase services, yet only use a small proportion of the purchased services, leaving a large portion of the possible bandwidth unallocated and unused. In some embodiments, a service provider might utilize the unrealized portions of the bandwidth of the subscriber STB or intelligent media devices without impact to the end user or subscriber.

In one example, a first wireless STB might use 20 Mbps of bandwidth in the home and might have 40 Mbps of bandwidth available. Meanwhile, a second wireless STB might use 20 Mbps in the home and might have 54 Mbps of un-provisioned bandwidth. The first wireless STB might scan for available transmitters to determine if the available transmitters can help to fulfill its request for more bandwidth. In this manner, the second wireless STB might be discovered to have 20 Mbps of bandwidth available for sharing, and the first wireless STB might request this bandwidth to fulfill its needs.

In another example, an internet protocol television ("IPTV") customer with 576 KB/288 KB high speed data service and 2 high definition ("HD") Streams and 1 standard definition stream might use 8 Mbps for the first HD stream, 8 Mbps for the second HD stream, 5 Mbps for the standard definition stream, and a certain bandwidth (e.g., 1 Mbps) for ICC Overhead. The customer might have a bonded service and combined train rate of about 36 Mbps/2.5 Mbps. Accordingly, the customer might have ~14 Mbps/~1.5 Mbps (i.e., 36−8−8−5−1=14 Mbps; 2.5−1=1.5 Mbps) available to participate in the STB neighborhood bandwidth sharing.

One benefit to bandwidth sharing in the manner disclosed herein is that one can achieve bandwidth on demand for unused bandwidth from home-to-home exchanges in a peering relationship. In addition, service providers can sell the remaining bandwidth for other services in the home, which could be utilized during peak times, peak uses, or both. In the case of subscription-type services (including, without limitation, IPTV/Video, PPV, media-on-demand, and the like), service provider content related to such subscription-type services can be safely distributed via encrypted methods to prevent unauthorized viewing of content.

Other benefits include bandwidth sharing of neighboring STBs to cover losses due to inherent limitations in wireless transmission technologies (such as inherent times of "unavailability" and loss commonly associated with wireless transmission), to cover losses due to telecommunications relay systems being down, to cover out of service areas, to compensate for rain fade or other weather conditions (e.g., storm interference, signal passing through precipitation, etc.) that might impact signal strength to specific sets of STBs, and the like.

FIGS. 1-11 illustrate some of the features of the method, apparatus, and system for providing media content or data over a licensed spectrum and an unlicensed spectrum via two or more STBs, as referred to above. The methods, apparatuses, and systems illustrated by FIGS. 1-11 refer to examples of different embodiments that include various components and steps, which can be considered alternatives or which can be used in conjunction with one another in the various embodiments. The description of the illustrated methods, apparatuses, and systems shown in FIGS. 1-11 is provided for purposes of illustration and should not be considered to limit the scope of the different embodiments.

FIG. 1 illustrates a general schematic diagram of a system 100 for providing media content, data, or both to a set-top box via a plurality of set-top boxes over both licensed and unlicensed spectrum, in accordance with various embodiments. In FIG. 1, system 100 might comprise a media center 105, a media content receiver 110, a media content server 115, a media content database 120, a network 125, a remote terminal or pedestal 130, a telecommunications system 135, and a plurality of customer premises 140.

In some embodiments, the media center 105 might receive media content, data, or both from one or more of the media content receiver 110, the media content server 115, the media content database 120, or network 125. The media content might include, without limitation, video content, audio content, or the like. The media content receiver 110 might include any type of receiver, including, but not limited to, a satellite dish, a telecommunications antenna or tower, or the like. The telecommunications system 135, according to some embodiments, might include one or more towers, one or more satellites, or the like. The plurality of customer premises 140 might include, without limitation, one or more homes or residences 140a, 140b (shown, e.g., as "Home A" and "Home B" in FIG. 1), one or more commercial or business properties (not shown), or the like.

The system 100 might further comprise, within customer residence 140a (i.e., "Home A"), residential gateway ("RG") 145, database 150a, a plurality of set-top boxes ("STBs") 155, and a plurality of user television sets ("TVs") 160.

According to some embodiments, the RG 145 may be located within user or customer premises 140a. In such a case, the RG 145 may include multi-function network computer appliances used in homes, which may combine one or more DSL modems or cable modems, one or more network switches (for providing LAN switching), one or more consumer-grade routers, and one or more wireless access points. The one or more DSL or cable modems, one or more network switches, one or more routers, and one or more wireless access points may be embodied in separate components or may be integrated into a single device or a series of integrated devices having all four functionalities.

According to some embodiments, the RG 145 may be located outside user or customer premises 140a. Such an external RG 145 might function in a similar manner, and might comprise similar components and equipment, as described above with regard to RG 145 that is located within customer premises 140a. Regardless of location, the RG 145 might serve as a gateway to network 125 for STBs 155.

The plurality of STBs 155 might comprise STBs 155a, 155b, through 155n, which in the non-limiting example of FIG. 1 might be designated $STB_1$, $STB_2$, and $STB_3$. The plurality of user television sets 160 might comprise user TVs 160a, 160b, through 160n, each of which might include any one of a high-definition ("HD") television, an IPTV, and a cable television, or the like, where one or both of HD TV and IPTV may be interactive TVs. According to some embodiments, each of STBs 155a through 155n might be operatively coupled with each of TVs 160a through 160n, respectively, via cables including, but not limited to, coaxial cables, HDMI cables, DVI cables, S-video cables, component cables, composite cables, any other type of video cables, or the like.

The system 100 might further comprise, within customer residence 140b (i.e., "Home B"), residential gateway ("RG") 165, database 150b, a plurality of set-top boxes ("STBs") 175, and a plurality of user television sets ("TVs") 180.

According to some embodiments, the RG 165 may be located within user or customer premises 140b. In such a case, the RG 165 may include multi-function network computer appliances used in homes, which may combine one or more DSL modems or cable modems, one or more network switches (for providing LAN switching), one or more consumer-grade routers, and one or more wireless access points. The one or more DSL or cable modems, one or more network switches, one or more routers, and one or more wireless access points may be embodied in separate components or may be integrated into a single device or a series of integrated devices having all four functionalities.

According to some embodiments, the RG 165 may be located outside user or customer premises 140b. Such an external RG 165 might function in a similar manner, and might comprise similar components and equipment, as described above with regard to RG 165 that is located within customer premises 140b. Regardless of location, the RG 165 might serve as a gateway to network 125 for STBs 175.

The plurality of STBs 175 might comprise STBs 175a, 175b, through 175n, which in the example of FIG. 1 might be designated $STB_4$, $STB_5$, and $STB_6$. The plurality of user television sets 180 might comprise user TVs 180a, 180b, through 180n, each of which might include any one of a high-definition ("HD") television, an IPTV, and a cable television, or the like, where one or both of HD TV and IPTV may be interactive TVs. According to some embodiments, each of STBs 175a through 175n might be operatively coupled with each of TVs 180a through 180n, respectively, via cables including, but not limited to, coaxial cables, HDMI cables, DMI cables, S-video cables, component cables, composite cables, any other type of video cables, or the like.

Each of STBs 160a through 160n and 175a through 175n might comprise a first wireless transceiver or radio 170a and a second wireless transceiver or radio 170b. In some embodiments, the first wireless transceiver or radio 170a might be configured to transmit or receive media content and/or data over a licensed spectrum (such as spectrum 185 or 185a), while the second wireless transceiver or radio 170b might be configured to transmit or receive media content and/or data over an unlicensed spectrum (such as spectrum 190 or 195). The unlicensed spectrum, according to some embodiments, might include, without limitation, WiFi or WLAN, or other wireless protocols (such as, but not limited to, IEEE 802.11 suite of protocols), or the like.

In FIG. 1, databases 150a and 150b might have stored thereon one or more tables listing available frequencies and/or bandwidths of a plurality of STBs in one or more customer premises 140 or within wireless (e.g., WiFi) range of each STB. Alternatively, or in addition, the system 100 might further comprise database 150c operatively coupled to the remote terminal 130 either directly, within a local area network ("LAN"), or via a network (such as network 125).

In operation, upon request for a particular media content and/or data from a user or subscriber via a first STB (such as STB 155a or $STB_1$), media center 105 might retrieve the requested media content and/or data from at least one of receiver 110, server 115, database 120, or network 125 (which might include the Internet, or the like), and might send the requested media content and/or data to remote terminal or pedestal 130 via network 125. The remote terminal 130 might determine whether the requested media content and/or data fall within the user's subscription service or whether and how much to charge the user for the requested media content and/or data. The remote terminal 130 may also determine how to deliver the media content and/or data to the requesting user—for example, determining whether to divide the media content and/or data into multiple portions or streams, or as one whole stream, or through which telecommunications means to efficiently or otherwise deliver the requested content or data.

In one example, the remote terminal 130 might initially determine that the content could be delivered as one stream to the STB 155a via RG 145 or directly to the STB 155a either via a direct wireline connection via network 125 and RG 145 as shown as a solid line connection in FIG. 1, or via a licensed spectrum (shown as lightning bolt 185, 185a). The remote terminal 130 may determine that more bandwidth is required for delivering the requested media content or data. Based on this determination, the remote terminal 130 might query at least one of one or more of databases 150a, 150b, or 150c, one or more RGs 145 or 165, and/or one or more of STBs 155b-155n or 175a-175n, or the like, to determine which of STBs 155b-155n or 175a-175n have available frequencies and/or bandwidth. In some embodiments, the remote terminal 130 might update one or more of databases 150a-150c with the information about the available frequencies and/or bandwidth. Such querying and/or updating may be performed either each time a determination is made that more bandwidth is required, on a periodic basis (such as each few seconds, minutes, hours, days, weeks, months, etc.), or both.

If it is determined (by the remote terminal 130) that one or more of STBs 155b-155n or 175a-175n have available frequencies and/or bandwidth, the remote terminal 130 might link STB 155a with the one or more of STBs 155b-155n or 175a-175n having available frequencies and/or bandwidth. The remote terminal 130 might also divide the media content or data into multiple streams; transmit a first stream to STB 155a via the licensed spectrum 185 and/or 185a; transmit a second, third, or more stream to the one or more of STBs 155b-155n or 175a-175n having available frequencies and/or bandwidth over a licensed spectrum (shown as lightning bolts 185', 185a'); and send instructions to the one or more of STBs 155b-155n or 175a-175n having available frequencies and/or bandwidth to transmit the second, third, or more stream to STB 155a via an unlicensed spectrum. The unlicensed spectrum are represented in FIG. 1 by lightning bolts 190 and 195, with lightning bolts 190 representing wireless communications over unlicensed spectrum within each customer premises 140 and with lightning bolts 195 representing wireless communications over licensed spectrum between adjacent or nearby customer premises 140. In some embodiments, the unlicensed spectrum 190 is functionally similar to unlicensed spectrum 195. In other embodiments, unlicensed spectrum might further allow for unicast and multicast broadcasting of media content. Error correction checks may also be performed on any of licensed spectrum 185', licensed spectrum 185a', unlicensed spectrum 190, or unlicensed spectrum 195.

The remote terminal 130 might further send to STB 155a appropriate instructions or information necessary for STB 155a to combine the multiple streams into a single stream or into one media content file or data file for display on user TV 160a. Such appropriate instructions or information might be sent to STB155a over licensed spectrum 165, 185a. After determining that the second, third, or more streams have been transmitted to STB 155a, and that no more streams of media content or data need be sent to STB 155a from the one or more of STBs 155b-155n or 175a-175n having available frequencies and/or bandwidth over the unlicensed spectrum 190 and/or 195, the remote terminal 130 might release the available frequencies and/or bandwidths, such as for other uses.

In an alternative example, rather than the remote terminal 130 determining and controlling the sharing of the media content or data through the other STBs, one of the STBs (e.g., STB 155a) might be the controlling component within system 100. For example, STB 155a might determine that more bandwidth is required, might query at least one of one or more databases 150a-150c and one or more other STBs (i.e., STBs 155b-155n or 175a-175n) for available frequencies and/or bandwidth, and might store the available frequencies and/or bandwidth in a table in local memory (i.e., in RAM or other memory in STB 155a). STB 155a might also update one or more databases 150a-150c with the available frequencies and/or bandwidth. As above, such querying and/or updating may be performed either each time a determination is made that more bandwidth is required and/or on a periodic basis (such as each few seconds, minutes, hours, days, weeks, months, etc.).

If one or more of the other STBs have available frequencies and/or bandwidth, STB 155a might link with said one or more of the other STBs having available frequencies and/or bandwidth over the unlicensed spectrum 190 and 195. STB 155a might stream a first portion of the media content or data over the licensed spectrum 185, 185a, and might stream a second, third, or more portions of the media content or data over the unlicensed spectrum 190 and 195 via the available frequencies and/or bandwidth of the at least one of the one or more of the other STBs having available frequencies and/or bandwidth. Determining that streaming of the second, third, or more portions of the media content or data has been completed, and that no more portions of media content or data need be sent to STB 155a from the one or more of STBs 155b-155n or 175a-175n having available frequencies and/or bandwidth over the unlicensed spectrum 190 and/or 195, STB 155a might release the available frequencies and/or bandwidth. STB 155a might further combine the first portion and the second, third, or more portions of the requested media content or data.

In some embodiments, a first STB (e.g., STB 155a) might frequency hop from one of the other STBs to another of the other STBs (or the next STB), based on available frequencies from each STB. In some cases, the first STB might form a mesh network with the other STBs within wireless range, and might utilize the mesh network to find available frequencies and/or bandwidth, and might subsequently use any of the available and unprovisioned frequencies and/or bandwidth for fulfilling its purposes. In other cases, the first STB might perform a bandwidth query to see what frequencies are available amongst the other STBs around it. Each STB might query a first neighboring STB for its bandwidth and might request the first neighboring STB to look at (or scan) the bandwidth of a set of second neighboring STBs (i.e., neighbor of the first neighbor), in order to determine whether a pass-through (such as a data pass-through) can be performed to another STB for available frequencies/bandwidth. For example, a first STB (e.g., STB 155a) might receive the media content or data from a second STB (e.g., STB 175a) via a data pass-through performed through a third STB (e.g., STB 175n), over the unlicensed spectrum.

According to some embodiments, out-of-service locations may be served using the systems and techniques described above. For example, if a first STB (e.g., STB 155a) is located in a customer premises that is in an out-of-service area, a second STB (e.g., STB 175a) might receive the media content or data from the remote terminal 130 either via wireline to the RG 165 or wirelessly over licensed spectrum 185' or 185a'. The second STB might subsequently send the media content or data to the first STB either directly over the unlicensed spectrum, or indirectly (via data pass-through) through a third STB (e.g., STB 175n) over the unlicensed spectrum. In this manner, the first STB might be able to receive the media content or data despite being an out-of-service location.

The network 125 can be any type of network familiar to those skilled in the art that can support data communications using any of a variety of commercially-available (and/or free or proprietary) protocols, including without limitation TCP/IP and the like. Merely by way of example, the network 125 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 115. In some cases, the remote terminal or pedestal 130, the media center 105, or both may each be embodied as one or more server computers. Each of the server computers may be configured with an operating system, including without limitation any of those discussed above, as well as any commercially (or freely) available server operating systems. Each of the servers may also be running one or more applications, which can be configured to provide services to one or more clients 155a through 155n and 175a through 175n, and/or other servers.

Merely by way of example, one of the servers 115 (or remote terminal 130, or media center 105, etc.) may be a web server, which can be used, merely by way of example, to process requests for web pages or other electronic documents from the STBs (155a-155n, 175a-175n), or from one or more user computers or mobile devices (not shown). The web server can also run a variety of server applications, including HTTP servers, FTP servers, CGI servers, database servers, Java servers, and the like. In some embodiments of the invention, the web server may be configured to serve web pages that can be operated within a web browser on one or more of the STBs to perform methods of the invention. The servers 115 may also function as a middleware server that provides content. For example, middleware servers may include a server for accessing media content and/or data, among other middleware servers. In addition, databases (e.g., one or more of databases 150a-150c) may be embodied as middleware or database servers.

The server computers 115, in some embodiments, might include one or more application servers, which can be configured with one or more applications accessible by a client running on one or more of the STBs (155a-155n, 175a-175n), or from one or more user computers or mobile devices (not shown). Merely by way of example, the server(s) 115 can be one or more general purpose computers capable of executing programs or scripts in response to instructions/requests from the STBs 155 and 175, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on one or more STBs 155 and 175. In some embodiments, an application server can create web pages dynamically for displaying the information in accordance with various embodiments, such as displaying a selection screen for an on-demand channel(s) as a web page(s). Data provided by an application server may be formatted as one or more web pages (comprising HTML, HTML5, JavaScript, etc., for example) and/or may be forwarded to STBs 155 and 175 (as described above, for example). Similarly, a web server might receive web page requests and/or input data from the STBs 155 and 175 and/or forward the web page requests and/or input data to an application server. In some cases, a web server may be integrated with an application server.

In accordance with further embodiments, one or more servers 115 can function as a file server and/or can include one or more of the files (e.g., application code, data files, etc.) necessary to implement various disclosed methods, incorporated by an application running on STBs 155 and 175. Alternatively, as those skilled in the art will appreciate, a file server can include all necessary files, allowing such an application to be invoked remotely by one or more the STBs 155 and 175.

It should be noted that the functions described with respect to various servers herein (e.g., media content server, etc.) can be performed by a single server and/or a plurality of specialized servers, depending on implementation-specific needs and parameters.

In certain embodiments, the system can include one or more databases including, but not limited to, databases or DBs 120 and 150a-150c, as described in greater detail with respect to the figures below. The location of the database(s) 120 and 150a-150c is discretionary: merely by way of example, databases 120 and/or 150c might reside on a storage medium local to (and/or resident in) a server 115 or a remote terminal 130. Alternatively, a database 150c can be remote from any or all of the servers 115 or remote terminal 130, so long as it can be in communication (e.g., via the network 125 or similar network) with one or more of these. In a particular set of embodiments, a database 120 and/or 150c can reside in a storage-area network ("SAN") familiar to those skilled in the art. In one set of embodiments, the database 120 and/or 150c can be a relational database, such as an Oracle database, that is adapted to store, update, and retrieve data in response to SQL-formatted commands. The database might be controlled and/or maintained by a database server, as described above, for example. In some embodiments, databases 150a and 150b might be functionality similar to database 150c, except that databases 150a and 150b might reside at the customer premises 140a and 140b, respectively.

In addition, various user devices (including, but not limited to, STBs 155 and 175, TVs 160 and 180, etc.) might also include a communications subsystem (not shown), which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem may permit data to be exchanged with a network (such as the networks described above, to name one example), with other computer systems, and/or with any other devices described herein.

Figure 2:
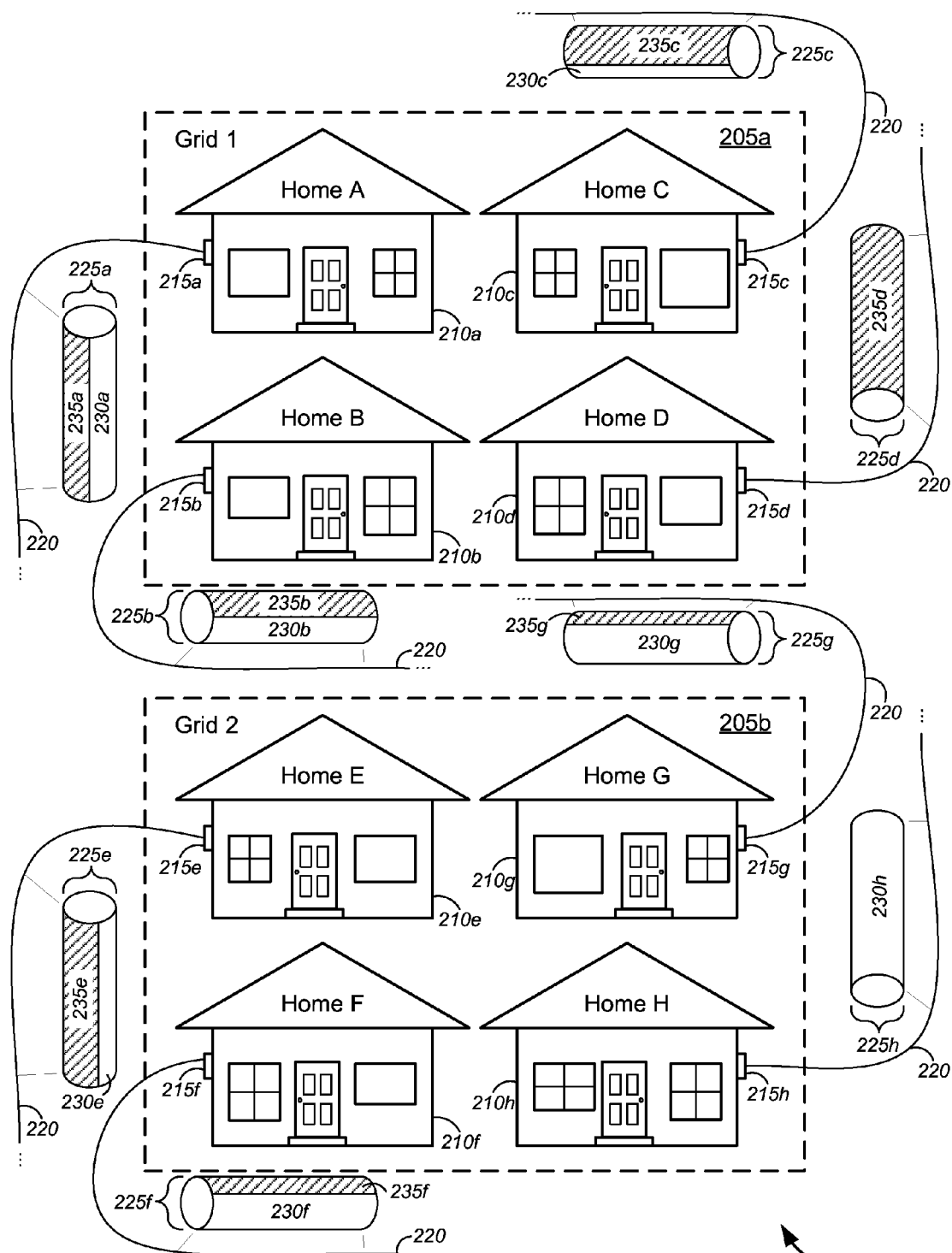
FIG. 2 is a general schematic diagram of a grid arrangement of neighborhoods of houses having available bandwidth for sharing media content and/or data, in accordance with various embodiments.

FIG. 2 is a general schematic diagram of a grid arrangement 200 of neighborhoods of customer premises having available bandwidth for sharing media content and/or data, in accordance with various embodiments. In FIG. 2, a plurality of neighborhoods 205 of customer premises 210 might be formed into grids. In some embodiments, a neighborhood 205 of customer premises 210 might comprise, without limitation, one or more rows of houses, one or more gated communities, one or more clusters of private homes, one or more housing developments, one or more apartment/condo complexes, one or more commercial customer premises or any appropriate subdivision of homes or customer premises or commercial premises, or the like.

In the simplified example of FIG. 2, a first neighborhood 205a might comprise a plurality of customer premises 210 (e.g., customer premises 210a-210d), which might each comprise a residential gateway ("RG") or other input 215 (e.g., RG or input 215a-215d) that might receive unicast or multicast media content or data through a transmission line 220 (which might comprise, without limitation, a wireline transmission line or wireless transmission over the licensed spectrum, or the like). In some cases, input 215 might include, without limitation, one or more licensed and unlicensed spectrum STBs as discussed herein. For example, home A (i.e., customer premises 210a) might comprise an RG 215a having a wireline connection 220, while home B (i.e., customer premises 210b) might comprise a licensed and unlicensed spectrum STB 215b (not unlike STBs 155, 175 described above with respect to FIG. 1, or STBs 305, 405, 505, 605, and 705 described below with respect to FIGS. 3-7, or the like) that might receive a wireless transmission over a licensed spectrum 220.

Likewise, a second neighborhood 205b might comprise a plurality of customer premises 210e-210h, which might each comprise RG or other input 215e-215h. RG or other input 215e-215h might receive media content or data via transmission line 220, which might include, but is not limited to, a wireline transmission line or wireless transmission over the licensed spectrum, or the like.

The transmission lines 220 leading into each RG or input 215 might have a total bandwidth 225, which might be specific to each customer premises 210, and might be based on the services subscribed to by the corresponding subscriber or owner of each of the customer premises. In some cases, the total bandwidth might be hardware or technology constrained (i.e., based on technological capacity of the equipment in the portion of the neighborhood or in the area), rather than based on negotiable subscription services. The total bandwidth might comprise used or provisioned bandwidth 230 and un-used or un-provisioned bandwidth 235.

For example, customer premises 210a might have a subscription from a service provider that specifies a total bandwidth 225a (e.g., 20 Mbps). Of the total bandwidth 225a, the subscriber at customer premises 210a might use provisioned bandwidth 230a (e.g., 10 Mbps), leaving un-provisioned or available bandwidth 235a (e.g., 10 Mbps).

Tables 1 and 2 below summarize, for example, the total, provisioned, and available bandwidths for each of the customer premises 210, divided into the two grids (i.e., Grid 1 and Grid 2).

TABLE 1

| Grid 1 | Total Bandwidth | Provisioned Bandwidth | Available Bandwidth |
|---|---|---|---|
| Home A (210a) | 20 Mbps | 10 Mbps | 10 Mbps |
| Home B (210b) | 40 Mbps | 20 Mbps | 20 Mbps |
| Home C (210c) | 40 Mbps | 10 Mbps | 30 Mbps |
| Home D (210c) | 40 Mbps | 0 Mbps | 40 Mbps |
| Total Bandwidths | 140 Mbps | 40 Mbps | 100 Mbps |

TABLE 2

| Grid 2 | Total Bandwidth | Provisioned Bandwidth | Available Bandwidth |
|---|---|---|---|
| Home E (210e) | 60 Mbps | 20 Mbps | 40 Mbps |
| Home F (210f) | 30 Mbps | 20 Mbps | 10 Mbps |
| Home G (210g) | 40 Mbps | 30 Mbps | 10 Mbps |
| Home H (210h) | 40 Mbps | 40 Mbps | 0 Mbps |
| Total Bandwidths | 170 Mbps | 110 Mbps | 60 Mbps |

Based on the tables above, Home A (customer premises 210a) might have 10 Mbps of available bandwidth to share with neighboring STBs, while Home B (customer premises 210b) might have 20 Mbps available, Home C (customer premises 210c) might have 30 Mbps available, and Home D (customer premises 210d, which might have cancelled services) might have all 40 Mbps available. The aggregate total available bandwidth for grid 1 might be 100 Mbps, which might be shared with other grids or with STBs in said other grids—that is, shared over the unlicensed spectrum as discussed herein with respect to FIGS. 1 and 3-11.

Similarly, in Grid 2, Home E (customer premises 210e) might have 40 Mbps available, while each of Homes F and G (customer premises 210f and 210g, respectively) might have 10 Mbps available, and Home H (customer premises 210h) might have none available. Here, the aggregate total available bandwidth for grid 2 might be 60 Mbps, which can be shared within the grid or outside the grid. For example, the subscriber at Home H (customer premises 210h) might have used up all of its total allotted bandwidth by streaming HD video content, audio files, and/or data files, while using up VoIP bandwidth. As such, Home H (customer premises 210h) might benefit from frequency and/or bandwidth sharing from any of Homes E-G (customer premises 210e-210g) in neighborhood 205b (Grid 2) and/or from any of Homes A-D (customer premises 210a-210d) in neighborhood 205a (Grid 1), or from aggregate grid 1 having total aggregate available bandwidth of 100 Mbps. In some cases, the service provider might charge the subscriber at Home H for the additional frequency/bandwidth, and in some cases, might also reimburse or provide discounts or rebates to the subscribers who provide or share their available frequencies/bandwidth.

FIGS. 3A-7B illustrate various aspects or embodiments of a licensed and unlicensed spectrum set-top box, having two or more transceivers or radios, with at least one transceiver or radio configured to receive and transmit media content or data over the licensed spectrum and at least one transceiver or radio configured to receive and transmit media content or data over the unlicensed spectrum. Some embodiments include attached transceivers or radios, while other embodiments include external and/or modular transceivers or radios. The attached transceivers or radios might comprise internal antenna transceivers or radios, or might include external antenna transceivers or radios. Likewise, the external or modular transceivers or radios might comprise internal antennas or external antennas.

Figure 3A:
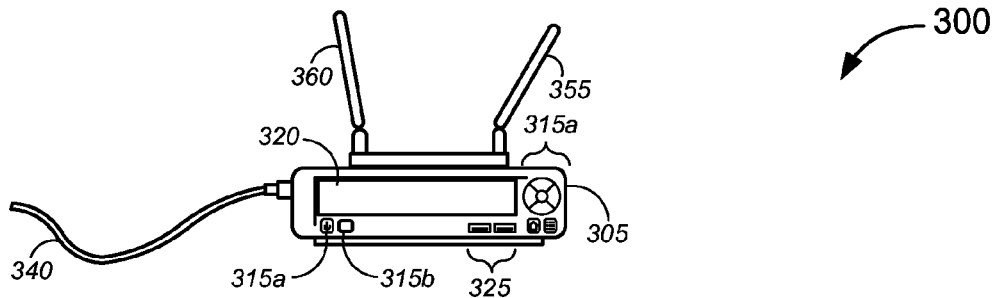
FIGS. 3A-3B are front and rear views of one example of a licensed and unlicensed spectrum set-top box, in accordance with various embodiments.
Figure 3B:
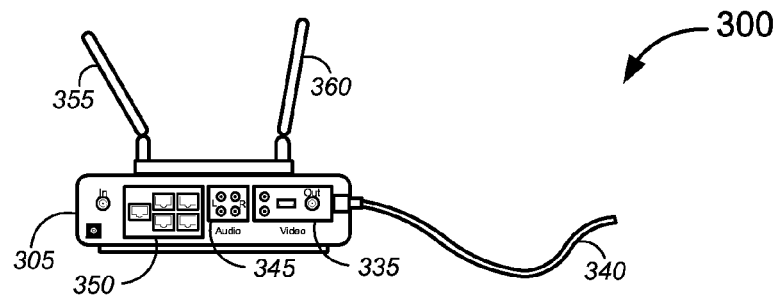
Figure 3C:
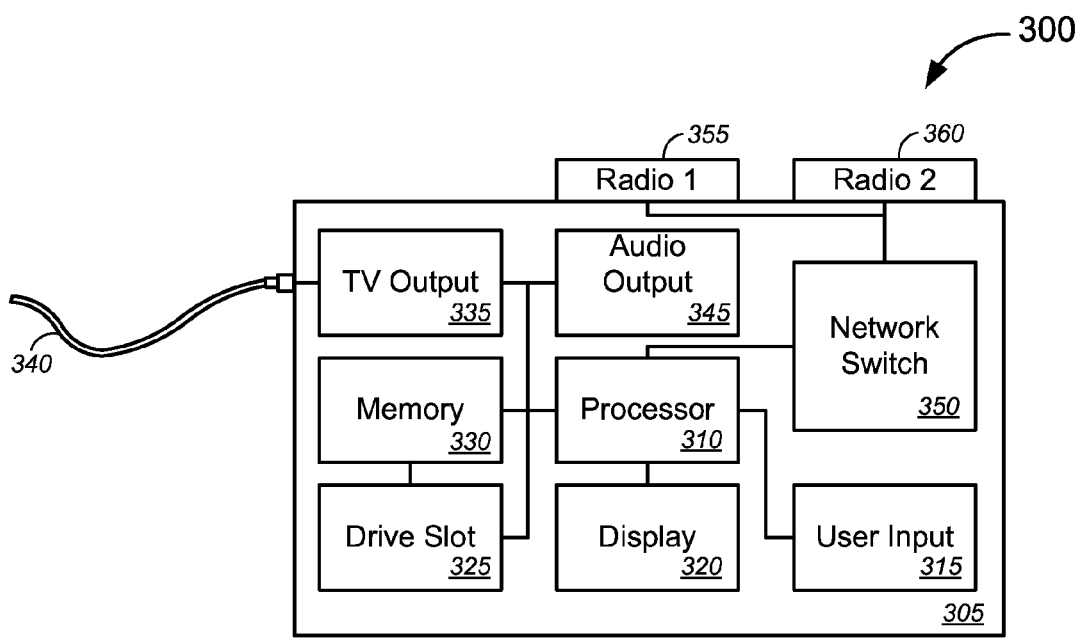
FIG. 3C is a schematic diagram of the licensed and unlicensed spectrum set-top box of FIGS. 3A-3B, in accordance with various embodiments.

For example, FIGS. 3A-3B are front and rear views of one example 300 of a licensed and unlicensed spectrum set-top box, in accordance with various embodiments. FIG. 3C is a schematic diagram of the licensed and unlicensed spectrum set-top box of FIGS. 3A-3B, in accordance with various embodiments. In FIGS. 3A-3C (collectively, "FIG. 3"), the STB 305 of aspect 300 might comprise processor 310, user inputs 315, display 320, drive slot 325, memory 330, TV output module 335, video cable 340, audio output module 345, network switch 350, a first transceiver 355 (i.e., "radio 1"), and a second transceiver 360 (i.e., "radio 2").

In some cases, user inputs 315 might include hard buttons 315a (including, but not limited to, a power button, a home button, a menu button, direction or arrow buttons, an enter or OK button, or the like) or soft buttons (i.e., touchscreen buttons, similar to the hard buttons 315a). User inputs 315 might further include wireless or infrared ("IR") inputs that receive signals from a remote controller associated with the STB 305 or from a universal remote controller.

Display 320, according to some cases, might include, but is not limited to, a liquid crystal display ("LCD"), a light emitting diode ("LED") display, an organic LED ("OLED") display, an active-matrix OLED ("AMOLED") display, or the like. Display 320 may either be a touchscreen display or a non-touchscreen display, or a combination of the two.

In some embodiments, drive slot 325 might include one or more USB slots each for receiving a USB flash memory drive, a USB cable connection to a portable memory drive, a USB cable connection to a desktop or laptop computer, or a USB-based wireless transceiver utilizing protocols such as the Bluetooth™ protocol or the like.

The TV Output module 335 might, according to some embodiments, include output ports for coaxial cables, HDMI cables, DVI cables, S-video cables, composite video cables, component video cables, or the like.

In FIG. 3, the network switch 350, the first transceiver 355, and the second transceiver 360 are built into or on the STB 305. The first transceiver 355 might be configured to transmit or receive data or media content over the licensed spectrum, while the second transceiver 360 might be configured to transmit or receive data or media content over the unlicensed spectrum.

Figure 4A:
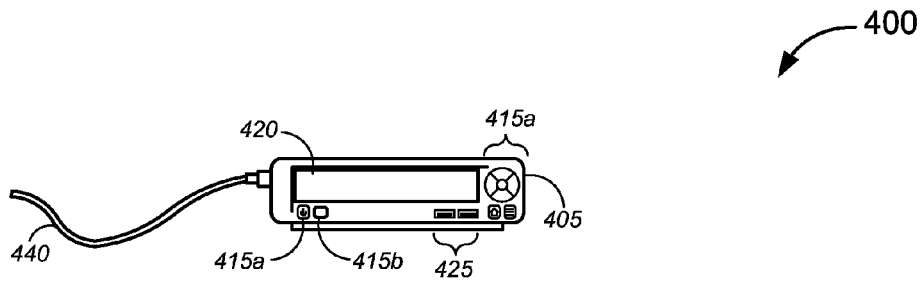
FIGS. 4A-4B are front and rear views of another example of a licensed and unlicensed spectrum set-top box, in accordance with various embodiments.
Figure 4B:
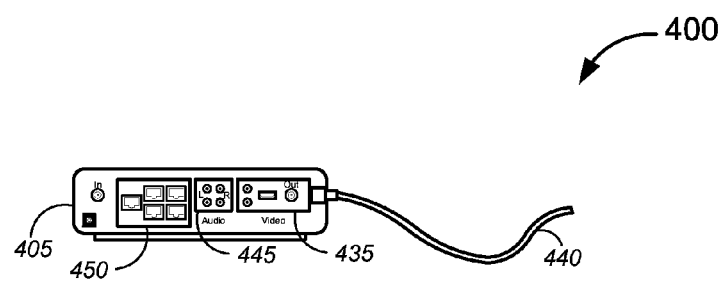
Figure 4C:
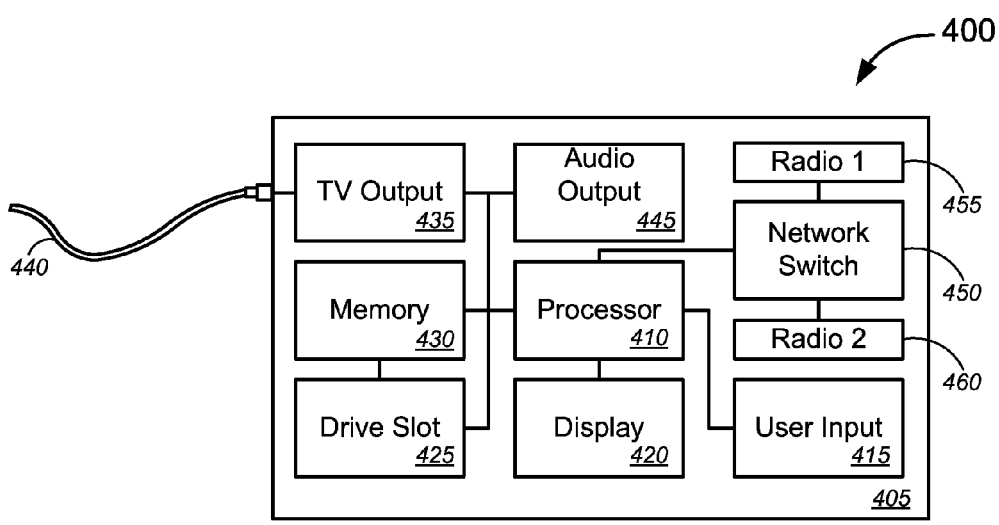
FIG. 4C is a schematic diagram of the licensed and unlicensed spectrum set-top box of FIGS. 4A-4B, in accordance with various embodiments.

FIGS. 4A-4B are front and rear views of another example of a licensed and unlicensed spectrum set-top box, in accordance with various embodiments. FIG. 4C is a schematic diagram of the licensed and unlicensed spectrum set-top box of FIGS. 4A-4B, in accordance with various embodiments. In FIGS. 4A-4C (collectively, "FIG. 4"), the STB 405 of aspect 400 might comprise processor 410, user inputs 415, display 420, drive slot 425, memory 430, TV output module 435, video cable 440, audio output module 445, network switch 450, a first transceiver 455 (i.e., "radio 1"), and a second transceiver 460 (i.e., "radio 2"). The various components 410-460 of STB 405 are functionally equivalent to the various components 310-360, except that the first transceiver 455 and the second transceiver 460 include internal antennas (or integrated circuit ("IC") antennas), whereas the first transceiver 355 and the second transceiver 360 include external antennas.

FIGS. 5A, 5B, and 5D are front, rear, and side views of an example of a modular licensed and unlicensed spectrum set-top box, in accordance with various embodiments. FIG. 5C is a schematic diagram of the modular licensed and unlicensed spectrum set-top box of FIGS. 5A, 5B, and 5D, in accordance with various embodiments. In FIGS. 5A-5D (collectively, "FIG. 5"), the STB 505 of aspect 500 might comprise processor 510, user inputs 515, display 520, drive slot 525, memory 530, TV output module 535, video cable 540, audio output module 545, network switch 550, a first transceiver 555 (i.e., "radio 1"), and a second transceiver 560 (i.e., "radio 2"). The various components 510-560 of STB 505 are functionally equivalent to the various components 310-360 and 410-460, except that the network switch 550, the first transceiver 555, and the second transceiver 560 are modular components that might be each removably attachable to the STB 505 (as shown by the dashed connecting lines). Similar to the first and second transceivers or radios 355 and 360, respectively, the first and second transceivers or radios 555 and 560 might include external antennas. In some cases, the removably attachable feature of the network switch 550, the first transceiver 555, and the second transceiver 560 might include "slide on/slide off technology." According to some embodiments, "slide on/slide off technology" might include mechanical structures on a first component (e.g., a module including, without limitation, network switch 550, first transceiver 555, second transceiver 560, network interfaces other than network switch 550, display connectors, power adaptors/expanders/conditioners, or system memory, and the like) and corresponding mating structures on a second component (e.g., a base unit such as STB 505, or the like) that allow the first component to be able to slide on or off the second component, in order to add new functionality to the second component. The mechanical structures, in some embodiments, may include any suitable grooves, notches, slots, holes, and the like, while the corresponding mating structures might include any suitable structure that are configured to mate with the respective grooves, notches, slots, holes, and the like. In other embodiments, the corresponding mating structures might include any suitable grooves, notches, slots, holes, and the like, while the mechanical structures may include any suitable structure that are configured to mate with the respective grooves, notches, slots, holes, and the like. In some cases, two or more first components may couple to the second component in this manner. Any of these mechanical structures or fittings can also include appropriate electrical and/or optical fittings to enable data and/or power transfer between the components. Alternatively, and/or additionally, any other standard or proprietary electrical and/or optical connectors, cables, or the like can be used to provide connectivity and power between components.

Figure 6A:
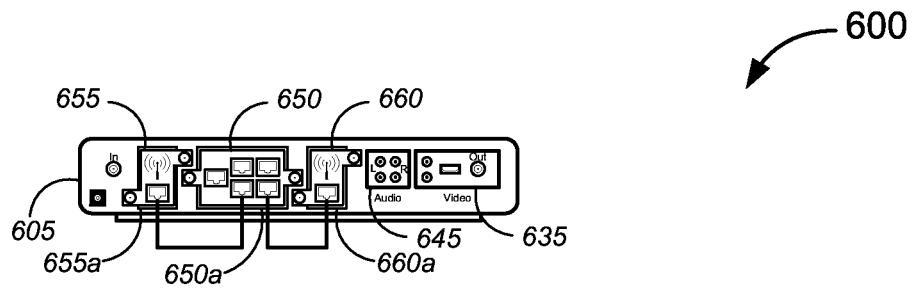
FIG. 6A is a rear view of another example of a modular licensed and unlicensed spectrum set-top box, in accordance with various embodiments.
Figure 6B:
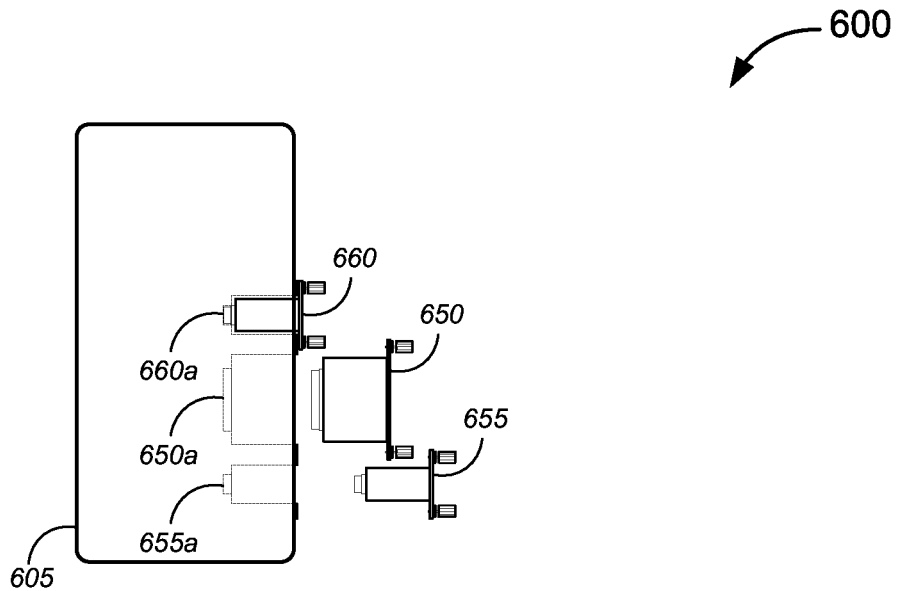
FIGS. 6B-6C are schematic diagrams of the licensed and unlicensed spectrum set-top box of FIG. 6A, in accordance with various embodiments.
Figure 6C:
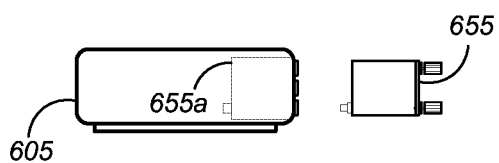

FIG. 6A is a rear view of another example of a modular licensed and unlicensed spectrum set-top box, in accordance with various embodiments. FIGS. 6B-6C are schematic diagrams of the licensed and unlicensed spectrum set-top box of FIG. 6A, in accordance with various embodiments. In FIGS. 6A-6C (collectively, "FIG. 6"), the STB 605 of aspect 600 might be functionally similar to the STB 405 as well as to the STB 505. Here, however, the STB 605 might include component ports or slots 650a, 655a, and 660a in the rear panel of the STB 605, beside video output module 635 and audio output module 645. Component ports or slots 650a, 655a, and 660a might be configured to include structure for removably receiving a network switch 650, a first transceiver or radio 655, and a second transceiver or radio 660, respectively.

As shown in the schematic diagrams of FIGS. 6B-6C, which illustrates the top and side views of the STB 605 that show in cut-out view the relative positions and shapes of an exemplary embodiment of component ports or slots 650a-660a, each of the network switch 650, the first transceiver 655, and the second transceiver 660 (collectively, the "modular components") might be removably inserted into the component ports or slots 650a-660a, respectively with connector portions of the modular components 650-660 mating with corresponding connector portions of the respectively component ports or slots 650a-660a. In some embodiments, thumb-screw attachments or similar attachment structures (including, without limitation, latches, clips, bolts, etc.) may be affixed to a rear portion of the modular components to securely fasten the modular components 650-660 to the rear panel of STB 605 in a removable fashion to allow for easy detachability while preventing the modular components 650-660 from accidentally or inadvertently falling out of the component ports or slots. 650a-660a.

Figure 7A:
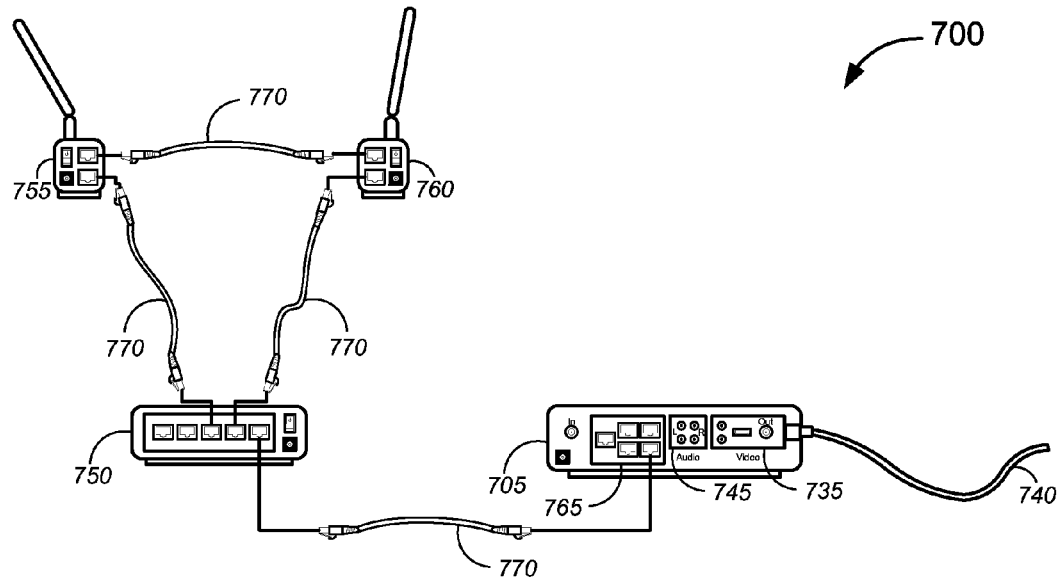
FIG. 7A is a rear view of another example of a licensed and unlicensed spectrum set-top box together with an external Ethernet switch and external wireless transceivers, in accordance with various embodiments.
Figure 7B:
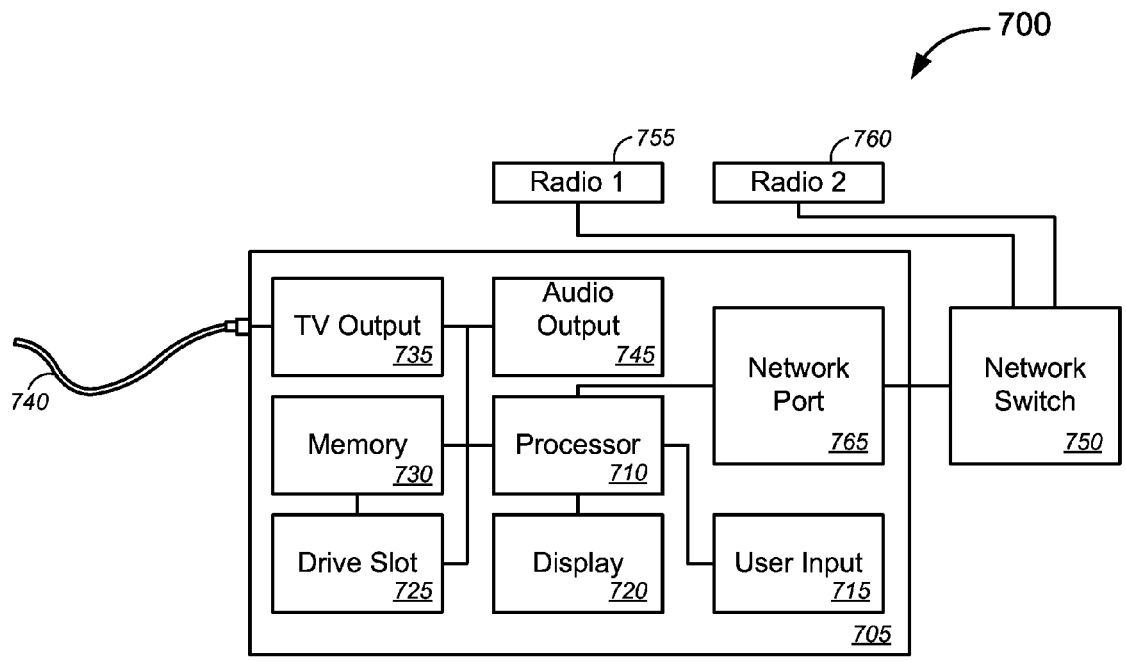
FIG. 7B is a schematic diagram of the licensed and unlicensed spectrum set-top box together with the external Ethernet switch and the external wireless transceivers of FIG. 7A, in accordance with various embodiments.

FIG. 7A is a rear view of another example of a licensed and unlicensed spectrum set-top box together with an external Ethernet switch and external wireless transceivers, in accordance with various embodiments. FIG. 7B is a schematic diagram of the licensed and unlicensed spectrum set-top box together with the external Ethernet switch and the external wireless transceivers of FIG. 7A, in accordance with various embodiments. In FIGS. 7A-7B (collectively, "FIG. 7"), STB 705 or aspect 700 might comprise processor 710, user inputs 715, display 720, drive slot 725, memory 730, TV output module 735, video cable 740, audio output module 745, and a network port 765. STB 705 might be operatively coupled to network switch 750, a first transceiver 755 (i.e., "radio 1"), and a second transceiver 760 (i.e., "radio 2") via corresponding network cables 770 (including, without limitation, Ethernet cables). The various components 710-760 of STB 705 might be functionally similar to the corresponding various components of STBs 305, 405, 505, and 605, except that instead of an internal network switch (such as network switch 350 or 450, STB 705 comprises a network port 765 connected to an external (stand-alone) network switch 750 via Ethernet cable 770, and each of external (stand-alone) first and second transceivers 755 and 760 connected via Ethernet cable 770 to each other and to network switch 750.

Figure 8:
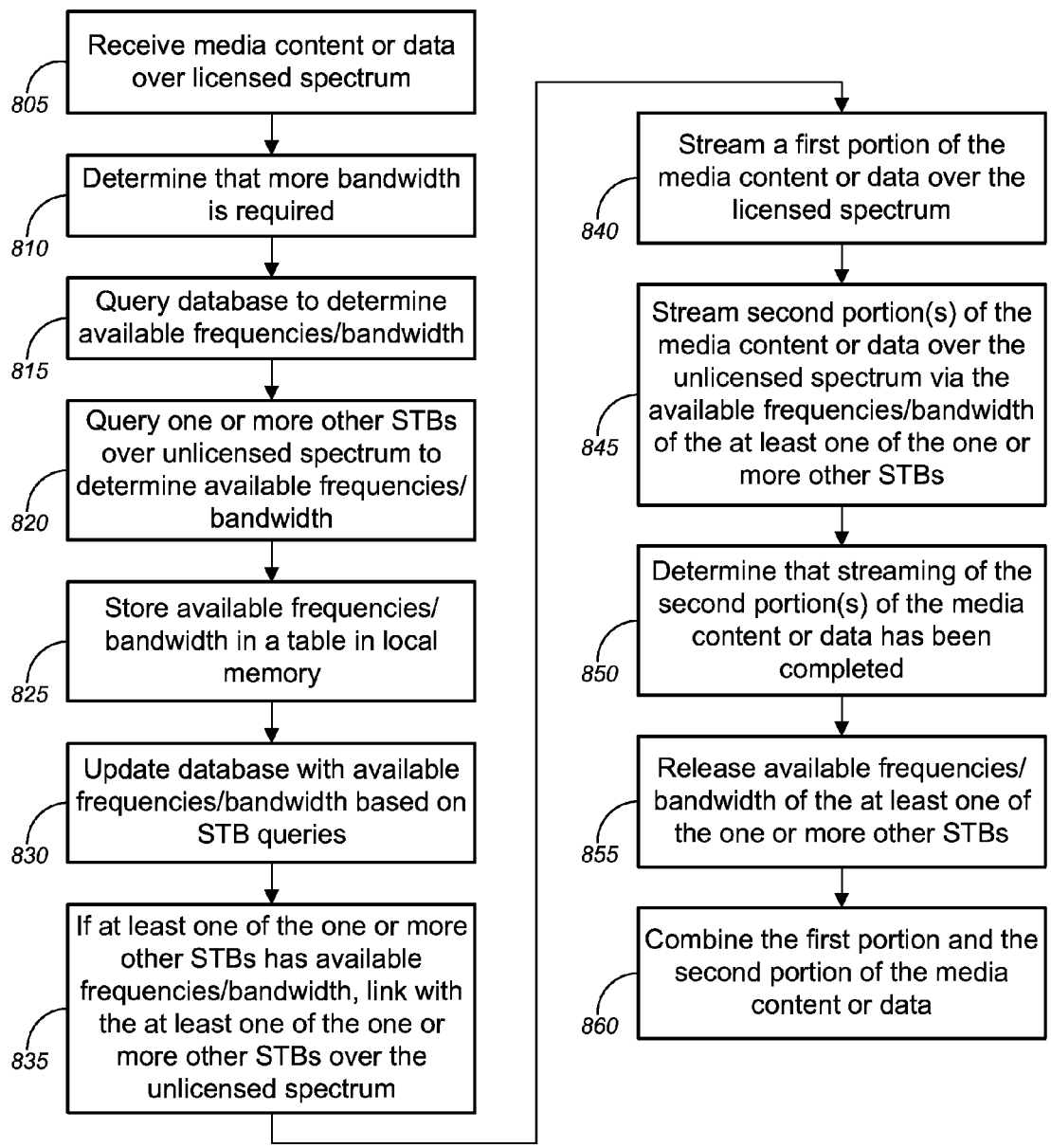
FIG. 8 is a flow chart illustrating an exemplary process of streaming portions of media content and/or data by a first set-top box over a licensed spectrum and over an unlicensed spectrum via available frequencies and/or bandwidth of one or more second set-top boxes, in accordance with various embodiments.
Figure 9A:
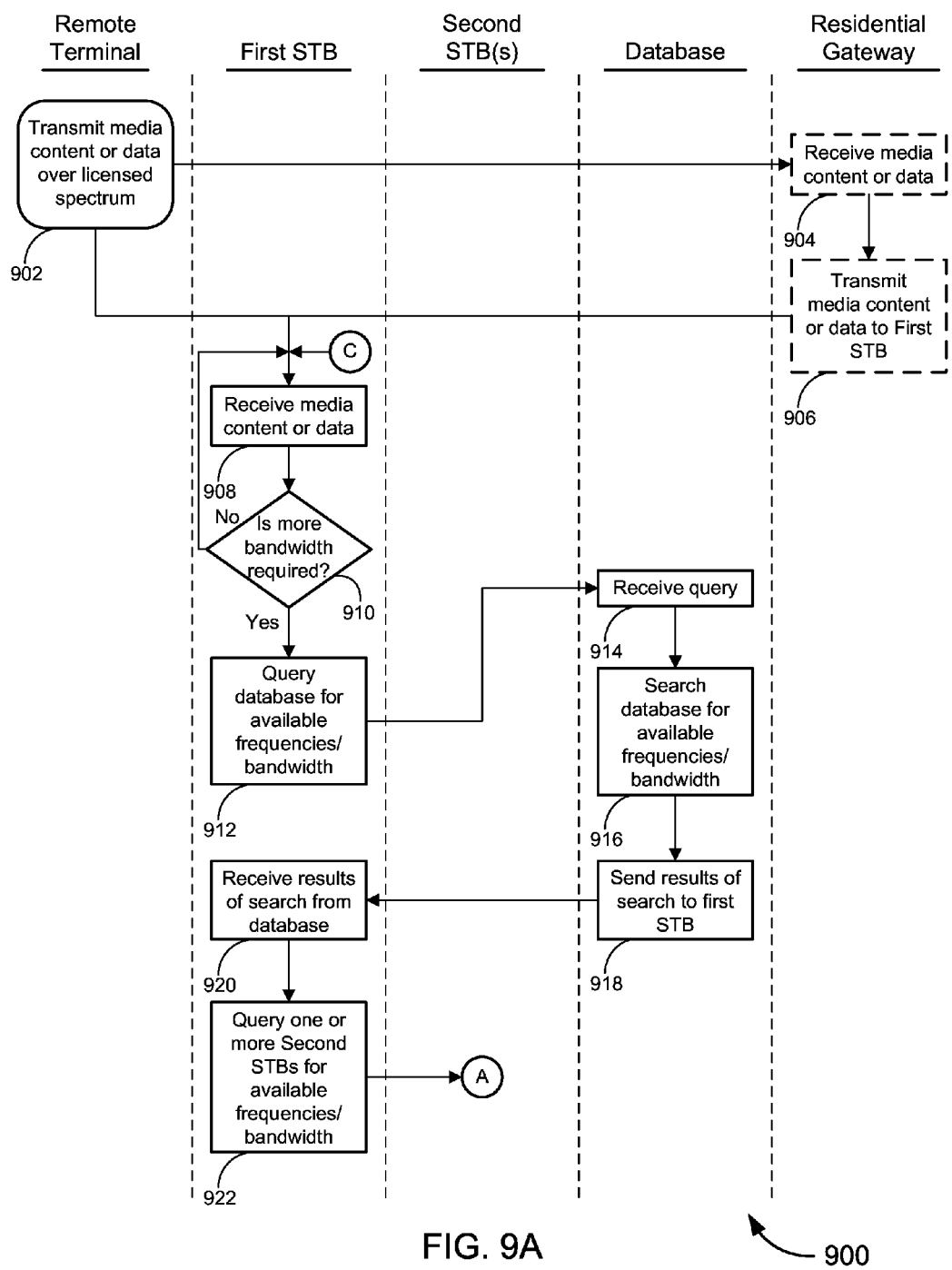
FIGS. 9A-9D represent a system flow diagram illustrating exemplary processes performed at or by components of a system in order for a first set-top box to stream portions of media content and/or data over a licensed spectrum and over an unlicensed spectrum via available frequencies and/or bandwidth of one or more second set-top boxes, in accordance with various embodiments.
Figure 9B:
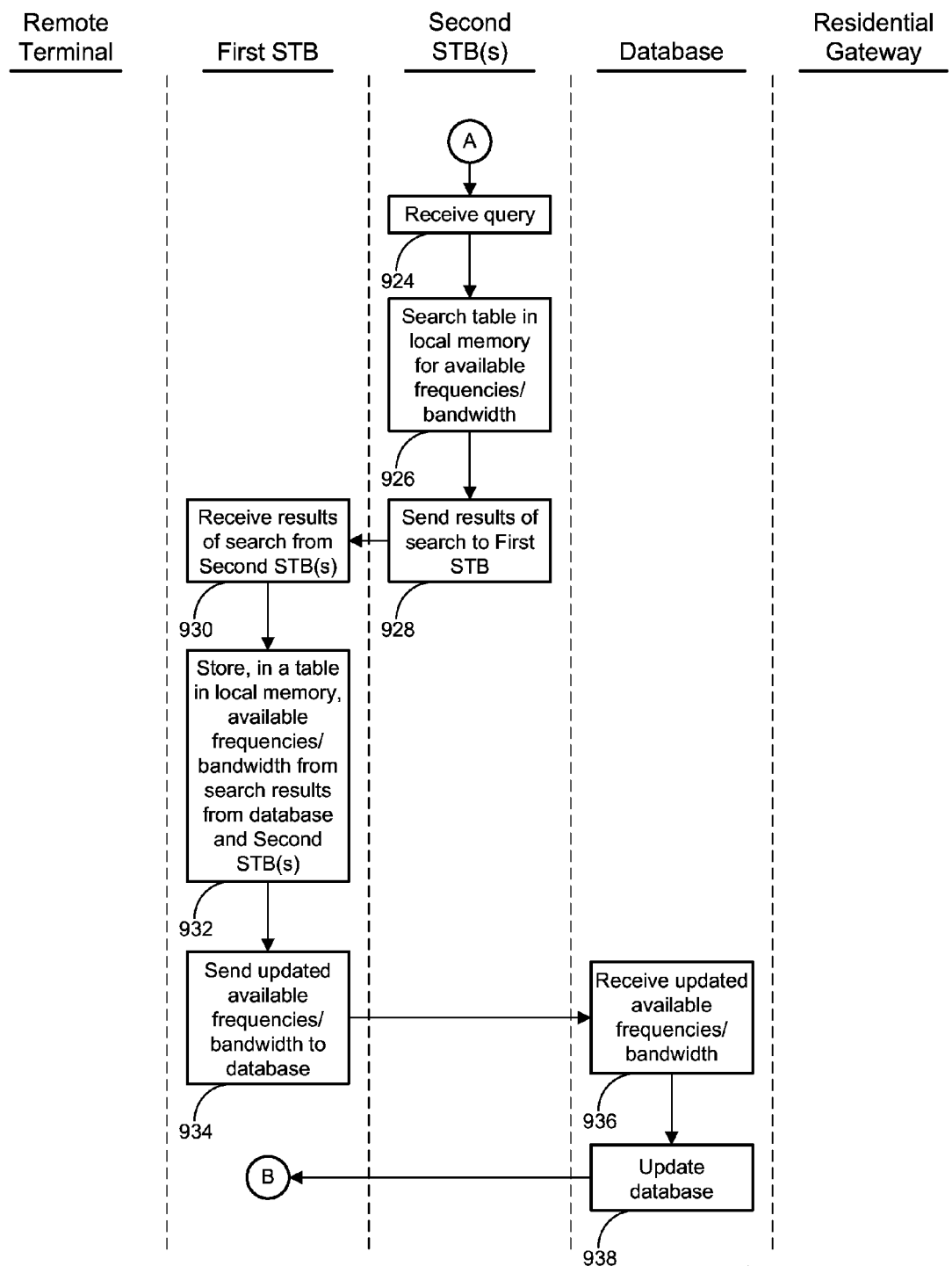
Figure 9C:
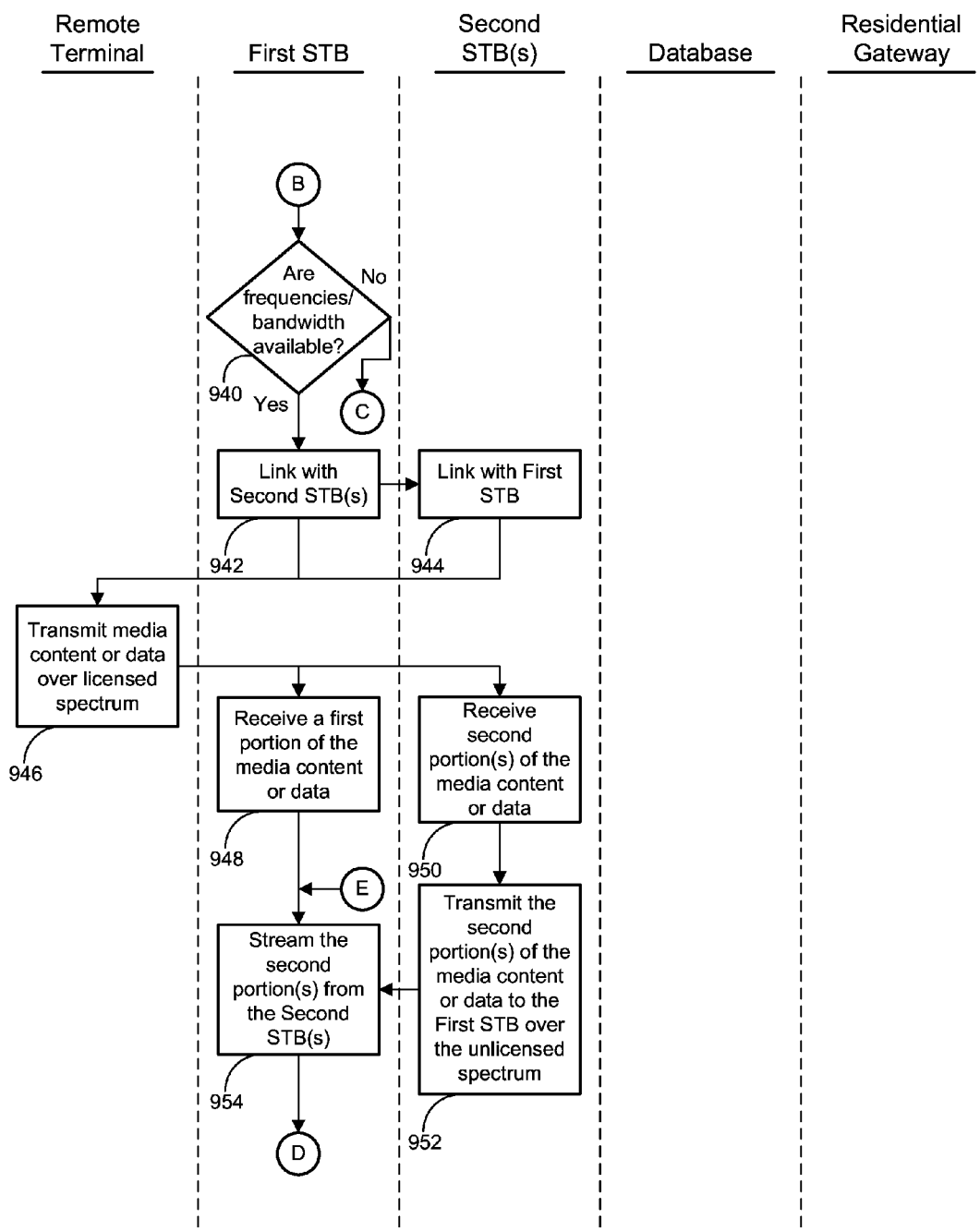
Figure 9D:
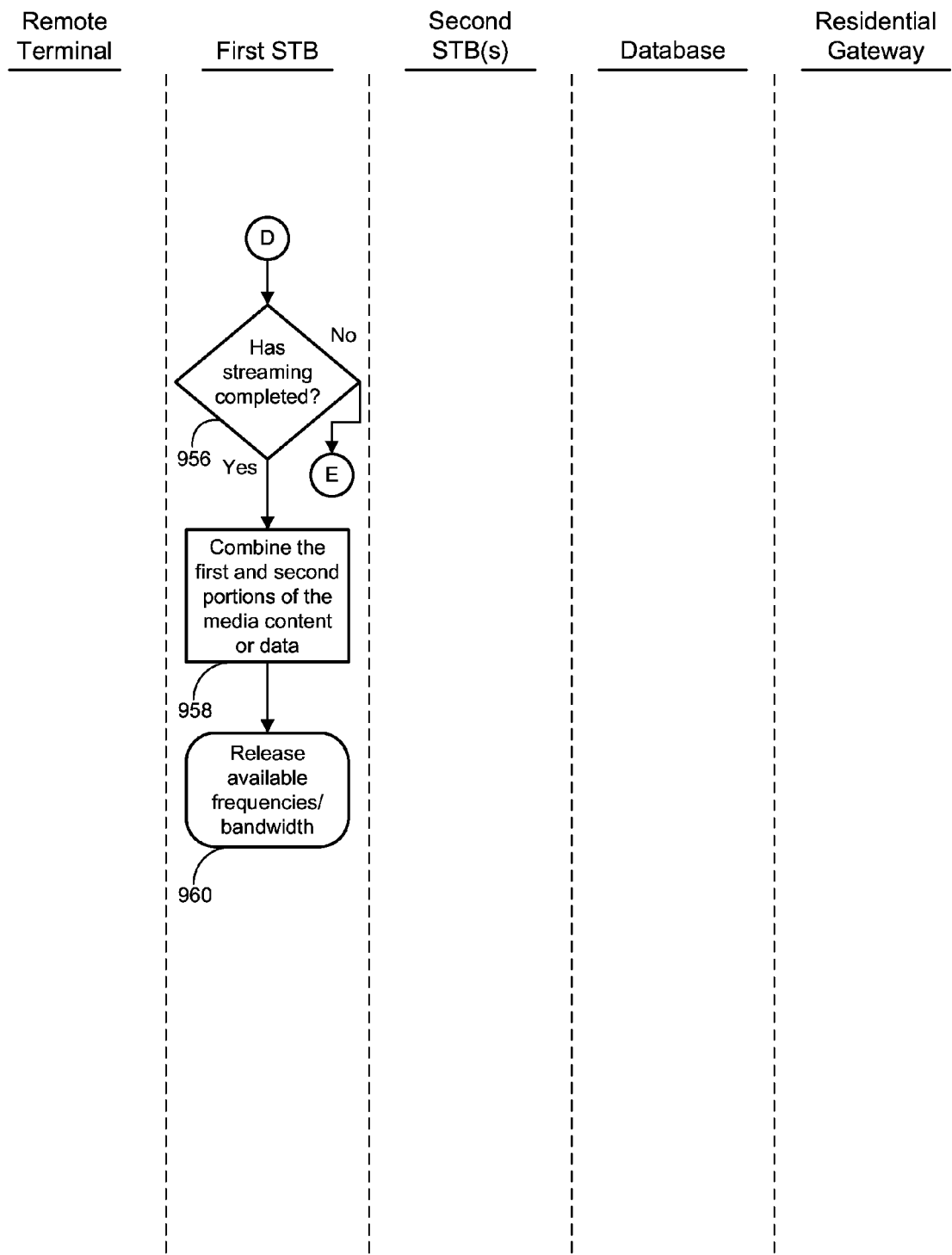
Figure 10:
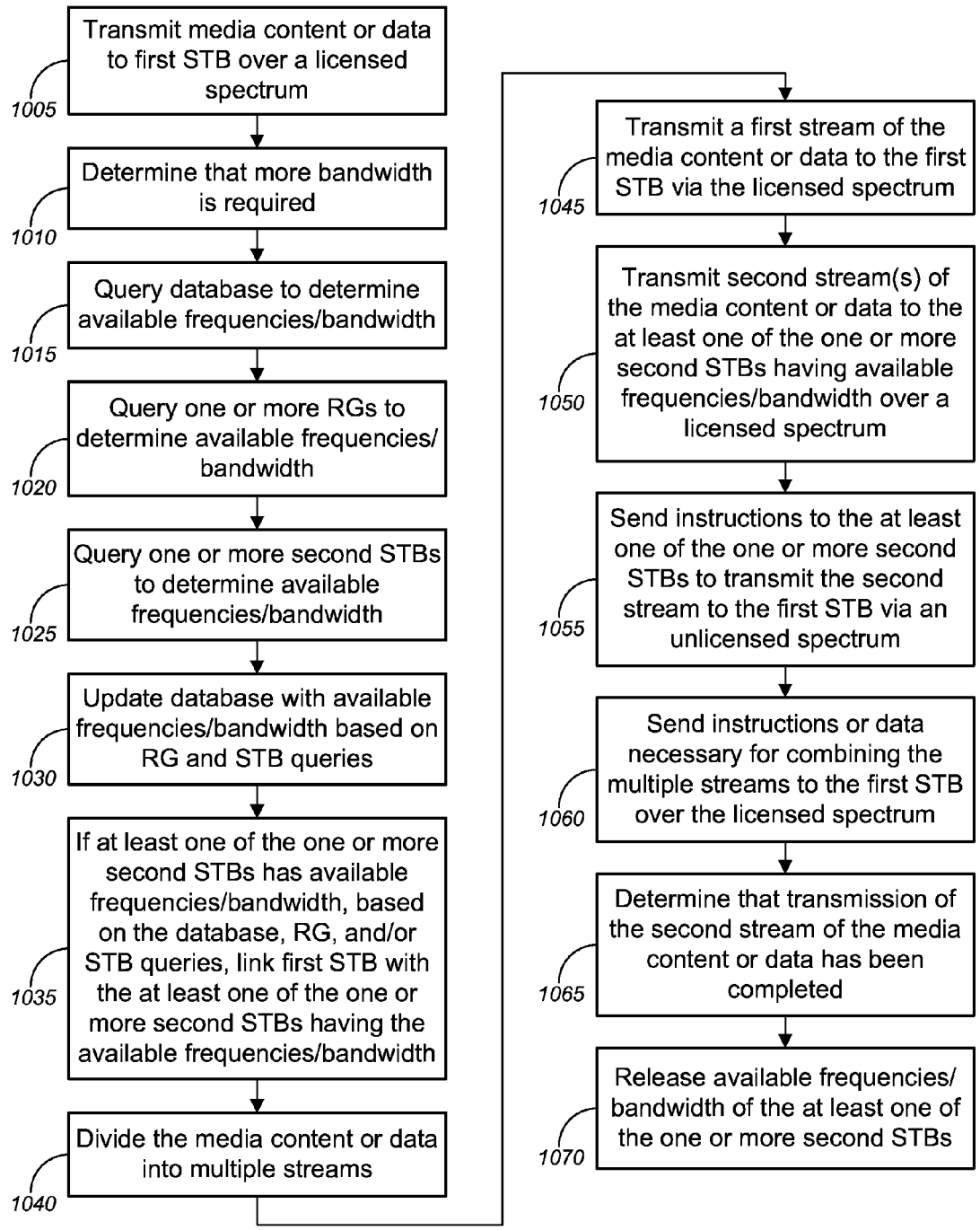
FIG. 10 is a flow chart illustrating an exemplary process of delivering portions of media content and/or data to a first set-top box over a licensed spectrum and over an unlicensed spectrum via available frequencies and/or bandwidth of one or more second set-top boxes, in accordance with various embodiments.

FIGS. 8 and 9 are directed to an STB-controlled process of streaming portions of media content or data over the unlicensed spectrum of other STBs, while FIGS. 10 and 11 are directed to a service provider-controlled process of delivering portions of media content or data to a first STB over the unlicensed spectrum of one or more second STBs.

FIG. 8 is a flow chart illustrating an exemplary process 800 of streaming portions of media content, data, or both by a first set-top box over a licensed spectrum and over an unlicensed spectrum via available frequencies and/or bandwidth of one or more second set-top boxes, in accordance with various embodiments. At block 805, the first STB (such as STB 155a shown in FIG. 1) might begin to receive media content or data over the licensed spectrum. In some embodiments, receiving the media content or data might be in response to a request by the subscriber via the first STB for the media content or data. In other embodiments, the media content or data may be broadcast media content or data. The process 800 might include the first STB determining that more bandwidth is required that is available to the first STB, at block 810. In some cases, the process step at block 805 might be skipped and the determination step at block 810 might be made upon request by the first STB. According to some embodiments, determining that more bandwidth is required might include, without limitation, comparing the available bandwidth with the bandwidth recommended or required for the size of the media content or data, or the like.

The first STB, at block 815, might subsequently query a database (such as one or more of databases 150a-150c shown in FIG. 1) to determine whether one or more second STBs within wireless range might have available frequencies and/or bandwidth. Alternatively, or in addition, the first STB might query the one or more second STBs directly over the unlicensed spectrum to determine available frequencies and/or bandwidth (block 820). The querying steps at blocks 815 and 820 may be performed sequentially in either order, or may be performed concurrently.

At block 825, the first STB might store the information regarding the available frequencies/bandwidth in a table in local memory (such as memory 330, 430, 530, 630, or 730 shown in FIGS. 3-7, respectively). The first STB might also update the database (e.g., one or more of databases 150a-150c shown in FIG. 1) with the information regarding the available frequencies/bandwidth, based on the queries at blocks 815 and 820.

Based on a determination that at least one of the one or more second STBs has available frequencies and/or bandwidth, the first STB might link with said at least one of the one or more second STBs having available frequencies and/or bandwidth over the unlicensed spectrum (block 835). At block 840, the first STB might stream a first portion of the media content or data over the licensed spectrum, and stream second, third, or more portions of the media content or data over the unlicensed spectrum via the available frequencies and/or bandwidth of the at least one of the one or more second STBs having available frequencies and/or bandwidth, at block 845. The first STB, at block 850, might determine that streaming of the second, third, or more portions of the media content or data has been completed, and based on this determination, might (at block 855) release the available frequencies and/or bandwidth of the at least one of the one or more second STBs having available frequencies and/or bandwidth, so that the available frequencies and/or bandwidth might be free for use for other purposes.

At block 860, the first STB might combine the first portion and the second portion of the media content or data for display on the TV (such as TV 160a shown in FIG. 1 connected to STB 155a via the video cable).

FIGS. 9A-9D (collectively, "FIG. 9") represent a system flow diagram illustrating exemplary processes 900 performed at or by components of a system in order for a first set-top box to stream portions of media content, data, or both over a licensed spectrum and over an unlicensed spectrum via available frequencies and/or bandwidth of one or more second set-top boxes, in accordance with various embodiments. The process 900 in FIG. 9A continues onto FIG. 9B, linked by the circular marker denoted by "A." Similarly, the process 900 in FIG. 9B continues onto FIG. 9C, linked by the circular marker denoted by "B," while the process in FIG. 9C continues onto FIG. 9D, linked by the circular marker denoted by "D." Circular markers denoted by "C" and "E" link to earlier blocks in the process 900.

Turning to FIG. 9A, process 900 might begin at block 902 with a remote terminal, such as remote terminal or pedestal 130 shown in FIG. 1, transmitting media content or data over the licensed spectrum. At block 904, a residential gateway—such as, but not limited to, RG 145 or 165 shown in FIG. 1—might receive the media content or data via the licensed spectrum (shown as lightning bolt 185 or 185' in FIG. 1). The residential gateway might transmit, at block 906, the media content or data to the first STB, which might include STB 155a shown in FIG. 1. The first STB might receive the media content or data at block 908. In some embodiments, rather than transmitting via the residential gateway, the remote terminal might transmit the media content or data over the licensed spectrum (e.g., over spectrum 185 shown in FIG. 1) directly to the first STB, which might receive the transmitted content or data via the first transceiver or radio of the first STB (e.g., the first transceiver 170a shown in FIG. 1).

At block 910, the first STB might make a determination as to whether more bandwidth might be required. Such determination might include comparing the available bandwidth of the first STB with the estimated or required bandwidth for the media content or data, which might be based on size of the media content or data. The first STB might, at block 912, query a database—such as one or more databases 150a-150c shown in FIG. 1—to determine whether one or more second STBs in wireless range might have available frequencies, bandwidth, or both. At block 914, the database might receive the query, and might search local or associated memory for available frequencies and/or bandwidth (block 916). The database, at block 918, might send the results of the search to the first STB, which might receive the results of the search at block 920.

The first STB might also query the one or more second STBs directly to determine whether any of the one or more second STBs might have available frequencies and/or bandwidth (block 922).

Continuing onto FIG. 9B, each of the one or more second STBs (including, without limitation, STBs 155b through 155n and 175a through 175n shown in FIG. 1, or any of STBs 305, 405, 505, 605, and 705 shown in FIGS. 3-7, respectively) might receive the query, at block 924, and might search a table in local memory (such as memory 330, 430, 530, 630, or 730 shown in FIGS. 3-7, respectively) for available frequencies and/or bandwidth, at block 926. In some embodiments, the step at block 926 might further include—in addition or alternative to the table search—each of the one or more second STBs looking up or scanning the status of its bandwidth usage. At block 928, the one or more second STBs might send the results of the search to the first STB, which, at block 930, might receive the results of the search.

At block 932, the first STB might store, in a table in local memory, the information regarding the available frequencies and/or bandwidth, together with reference to which of the one or more second STBs might have the available frequencies and/or bandwidth, based on the search results from the database and from the one or more second STBs. The first STB might, at block 934, send the updated information regarding the available frequencies and/or bandwidth to the database, which might receive the updated available frequencies and/or bandwidth information at block 936. At block 938, the database might update its local or associated memory with the updated information.

Continuing onto FIG. 9C, the first STB, at block 940, might make a determination as to whether there are any available frequencies and/or bandwidth based on the updated information now stored in the table and updated in the database. If not, the process 900 returns to block 908. If so, the process 900 continues to block 942

At blocks 942 and 944, the first STB might link with at least one of the one or more second STBs having the available frequencies and/or bandwidth, and vice versa. The remote terminal, at block 946 might transmit, over the licensed spectrum, the media content or data, a first portion of which might be received by the first STB (at block 948), while a second, third, or more portion of which might be received by said at least one of the one or more second STBs having the available frequencies and/or bandwidth (at block 950). At block 952, the at least one of the one or more second STBs having the available frequencies and/or bandwidth might transmit the second, third, or more portions of the media content or data to the first STB over the unlicensed spectrum (either within the customer premises and/or between customer premises). The first STB might stream the second, third, or more portions of the media content or data from the at least one of the one or more second STBs having the available frequencies and/or bandwidth, at block 954.

Continuing onto FIG. 9D, a determination might be made by the first STB as to whether streaming of the second, third, or more portions has been completed (block 956). If not, the process 900 returns to block 954. If so, process 900 continues to block 958, at which the first STB might combine the first and second, third, or more portions of the media content or data. At block 960, the first STB might release the available frequencies and/or bandwidth, so that the available frequencies and/or bandwidth might be free for use for other purposes.

FIG. 10 is a flow chart illustrating an exemplary process of delivering portions of media content and/or data to a first set-top box over a licensed spectrum and over an unlicensed spectrum via available frequencies and/or bandwidth of one or more second set-top boxes, in accordance with various embodiments. Alternative, or in addition, to the first STB making the determinations and controlling the process as described above with respect to FIGS. 8 and 9, the service provider—in particular, the remote terminal or pedestal 130 (as shown in FIG. 1)—might make the determinations and might control at least part of the process.

For example, the remote terminal might, at block 1005, transmit the media content or data to the first STB (e.g., STB 155a in FIG. 1) over a licensed spectrum (e.g., as represented by lightning bolts 185 in FIG. 1). Before or while transmitting the media content or data, the remote terminal might determine—for example, based on a comparison between the available bandwidth of the first STB and the estimated or required bandwidth for transmission of the media content or data (based, e.g., by size of the media content or data)—that more bandwidth might be required (block 1010).

At blocks 1015-1025, the remote terminal might query at least one of one or more databases (e.g., one or more of databases 150a-150c shown in FIG. 1), one or more residential gateways (e.g., RG 145 or 165 shown in FIG. 1), or one or more second STBs (e.g., STBs 155b through 155n and 175a through 175n shown in FIG. 1) to determine which, if any, of the one or more second STBs within wireless range might have available frequencies/bandwidth. The query steps in blocks 1015-1025 might be performed in sequence in any order or might be performed concurrently. At block 1030, the remote terminal might subsequently update the database with the information regarding the available frequencies/bandwidth, based on the queries at blocks 1015-1025.

Based on a determination that at least one of the one or more second STBs has available frequencies and/or bandwidth, which might be based on the database, RG, and STB queries at blocks 1015-1025, the remote might link the first STB with the at least one of the one or more second STBs having available frequencies and/or bandwidth over the unlicensed spectrum (block 1035). At block 1040, the remote terminal might divide the media content or data into multiple streams, and might transmit a first stream of the media content or data to the first STB via the licensed spectrum (block 1045), while transmitting the second, third, or more streams to the at least one of the one or more second STBs having available frequencies and/or bandwidth over the licensed spectrum (block 1050). The remote terminal, at block 1055, might send instructions to the at least one of the one or more second STBs having available frequencies and/or bandwidth to transmit the second, third, or more streams to the first STB via an unlicensed spectrum. At block 1060, the remote terminal might send, to the first STB over the licensed spectrum, instructions or data necessary for combining the multiple streams to the first STB. At block 1065, the remote terminal might determine whether transmission of the second, third, or more streams of the media content or data has been completed. Based on a determination that transmission has been completed, the remote terminal might release the available frequencies and/or bandwidth of said at least one of the one or more second STBs.

FIGS. 11A-11E (collectively, "FIG. 11") represent a system flow diagram illustrating exemplary processes performed at or by components of a system in order to deliver portions of media content and/or data to a first set-top box over a licensed spectrum and over an unlicensed spectrum via available frequencies and/or bandwidth of one or more second set-top boxes, in accordance with various embodiments. The process 1100 in FIG. 11A continues onto FIG. 11B, linked by the circular marker denoted by "A." Similarly, the process 1100 in FIG. 11B continues onto FIG. 11C, linked by the circular marker denoted by "B," while the process in FIG. 11C continues onto FIG. 11D, linked by the circular marker denoted by "C," and continues onto FIG. 11E linked by the circular marker denoted by "F." Circular markers denoted by "D," "E," and "G" link to earlier blocks in the process 1100.

Figure 11A:
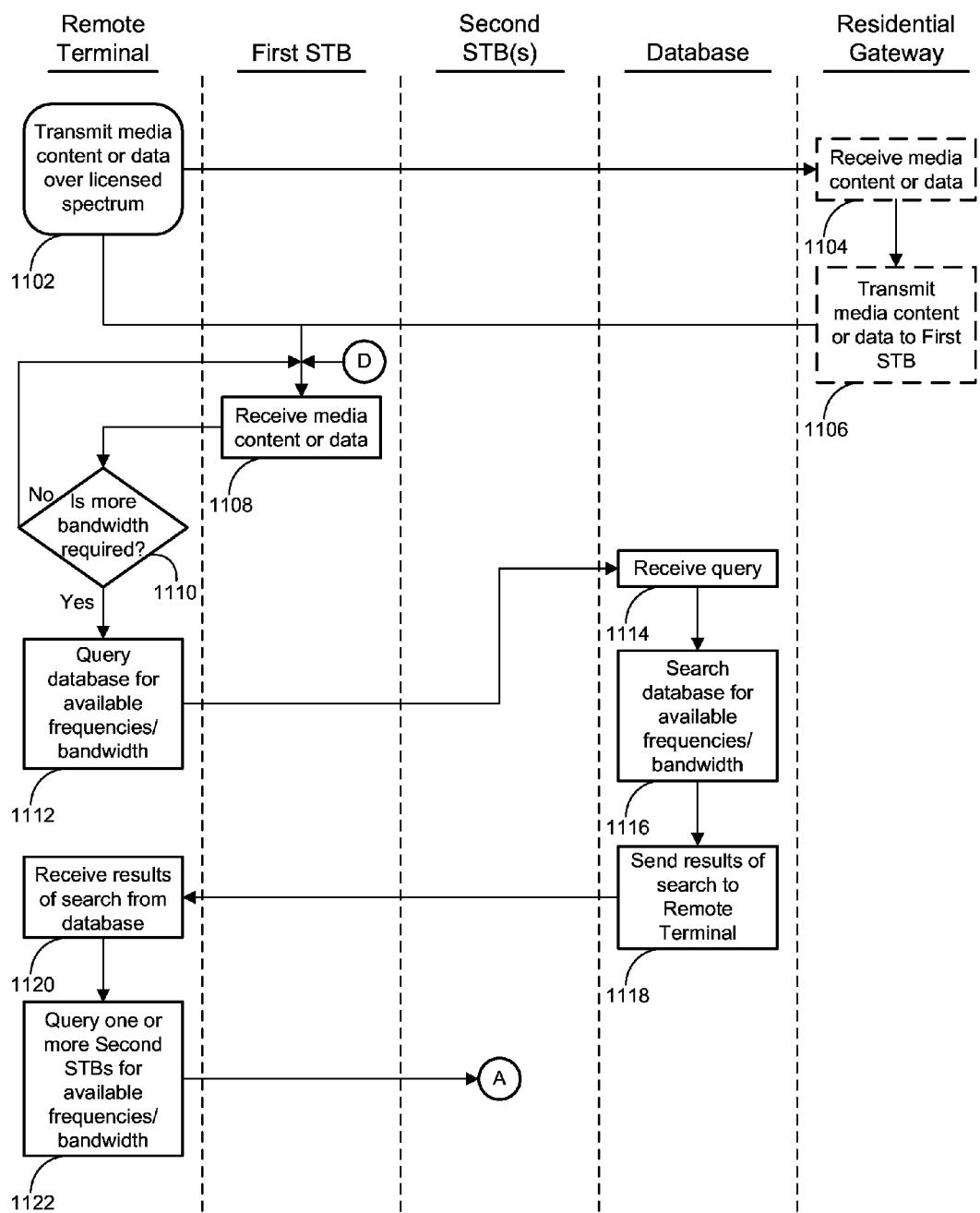
FIGS. 11A-11E represent a system flow diagram illustrating exemplary processes performed at or by components of a system in order to deliver portions of media content and/or data to a first set-top box over a licensed spectrum and over an unlicensed spectrum via available frequencies and/or bandwidth of one or more second set-top boxes, in accordance with various embodiments.

Turning to FIG. 11A, process 1100 might begin at block 1102 with a remote terminal, such as remote terminal or pedestal 130 shown in FIG. 1, transmitting media content or data over the licensed spectrum. At block 1104, a residential gateway—such as, but not limited to, RG 145 or 165 shown in FIG. 1—might receive the media content or data via the licensed spectrum (shown as lightning bolt 185 or 185' in FIG. 1). The residential gateway might transmit, at block 1106, the media content or data to the first STB, which might include STB 155a shown in FIG. 1. The first STB might receive the media content or data at block 1108. In some embodiments, rather than transmitting via the residential gateway, the remote terminal might transmit the media content or data over the licensed spectrum (e.g., over spectrum 185 shown in FIG. 1) directly to the first STB, which might receive the transmitted content or data via the first transceiver or radio of the first STB (e.g., the first transceiver 170a shown in FIG. 1).

At block 1110, the remote terminal might make a determination as to whether more bandwidth might be required. Such determination might include comparing the available bandwidth of the first STB with the estimated or required bandwidth for the media content or data, which might be based on size of the media content or data. The remote terminal might, at block 1112, query a database—such as one or more databases 150*a*-150*c* shown in FIG. 1—to determine whether one or more second STBs in wireless range might have available frequencies, bandwidth, or both. At block 1114, the database might receive the query, and might search local or associated memory for available frequencies and/or bandwidth (block 1116). The database, at block 1118, might send the results of the search to the remote terminal, which might receive the results of the search at block 1120.

The remote terminal might also query the one or more second STBs directly to determine whether any of the one or more second STBs might have available frequencies and/or bandwidth (block 1122).

Figure 11B:
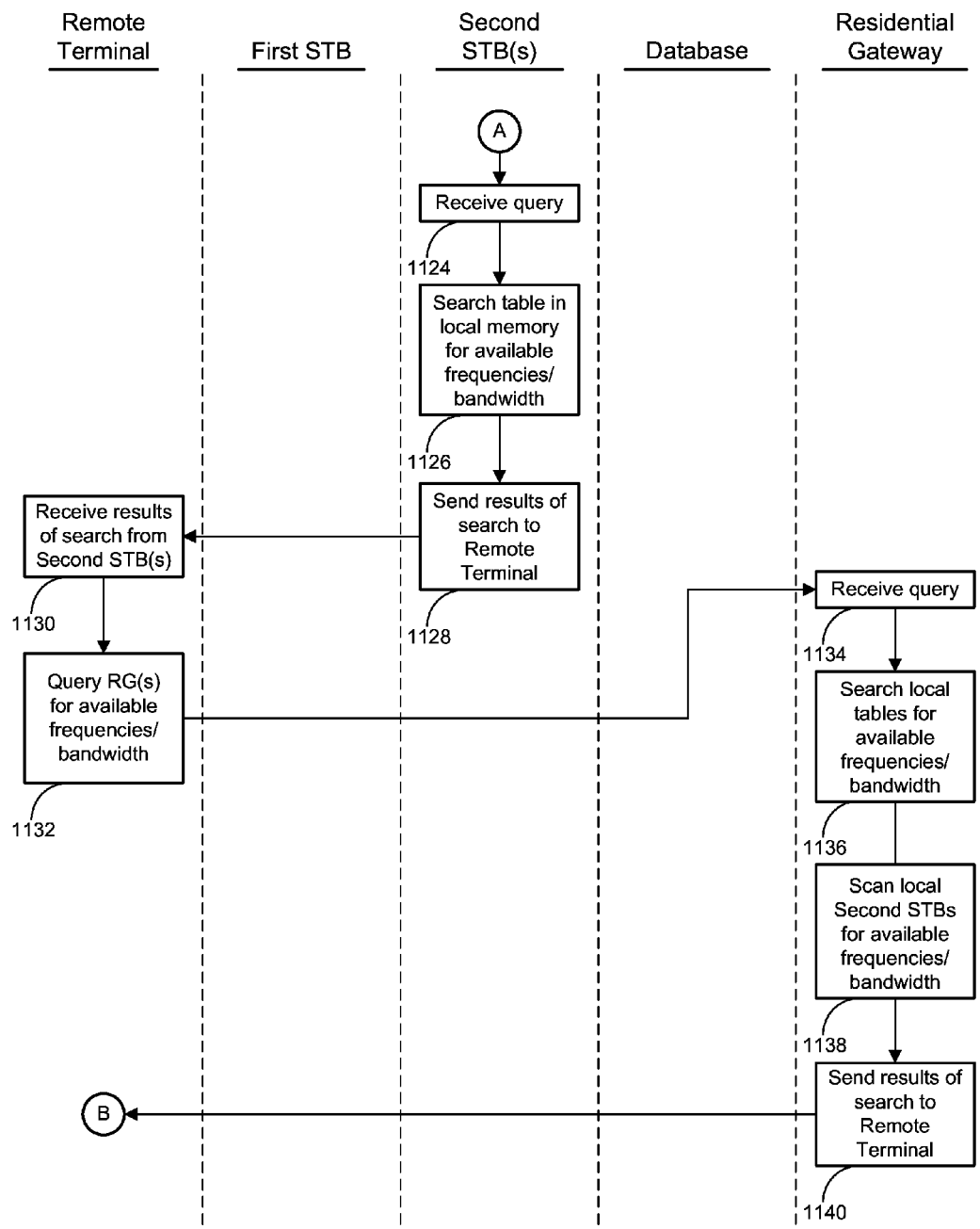

Continuing onto FIG. 11B, each of the one or more second STBs (including, without limitation, STBs 155*b* through 155*n* and 175*a* through 175*n* shown in FIG. 1, or any of STBs 305, 405, 505, 605, and 705 shown in FIGS. 3-7, respectively) might receive the query, at block 1124, and might search a table in local memory (such as memory 330, 430, 530, 630, or 730 shown in FIGS. 3-7, respectively) for available frequencies and/or bandwidth, at block 1126. In some embodiments, the step at block 1126 might further include—in addition or alternative to the table search—each of the one or more second STBs looking up or scanning the status of its bandwidth usage. At block 1128, the one or more second STBs might send the results of the search to the remote terminal, which, at block 1130, might receive the results of the search.

At block 1132, the remote terminal might further query one or more residential gateways (including, but not limited to, RGs 145 or 165 shown in FIG. 1) to determine whether any of the one or more second STBs that might be associated therewith might have available frequencies and/or bandwidth. The residential gateway might, at block 1134, receive the query, and might, at block 1136, search local tables for available frequencies and/or bandwidth. The residential gateway might also scan the local second STBs (i.e., the second STBs associated with the residential gateway) for available frequencies and/or bandwidth (block 1138). At block 1140, the residential gateway might send results of the search to the remote terminal.

Figure 11C:
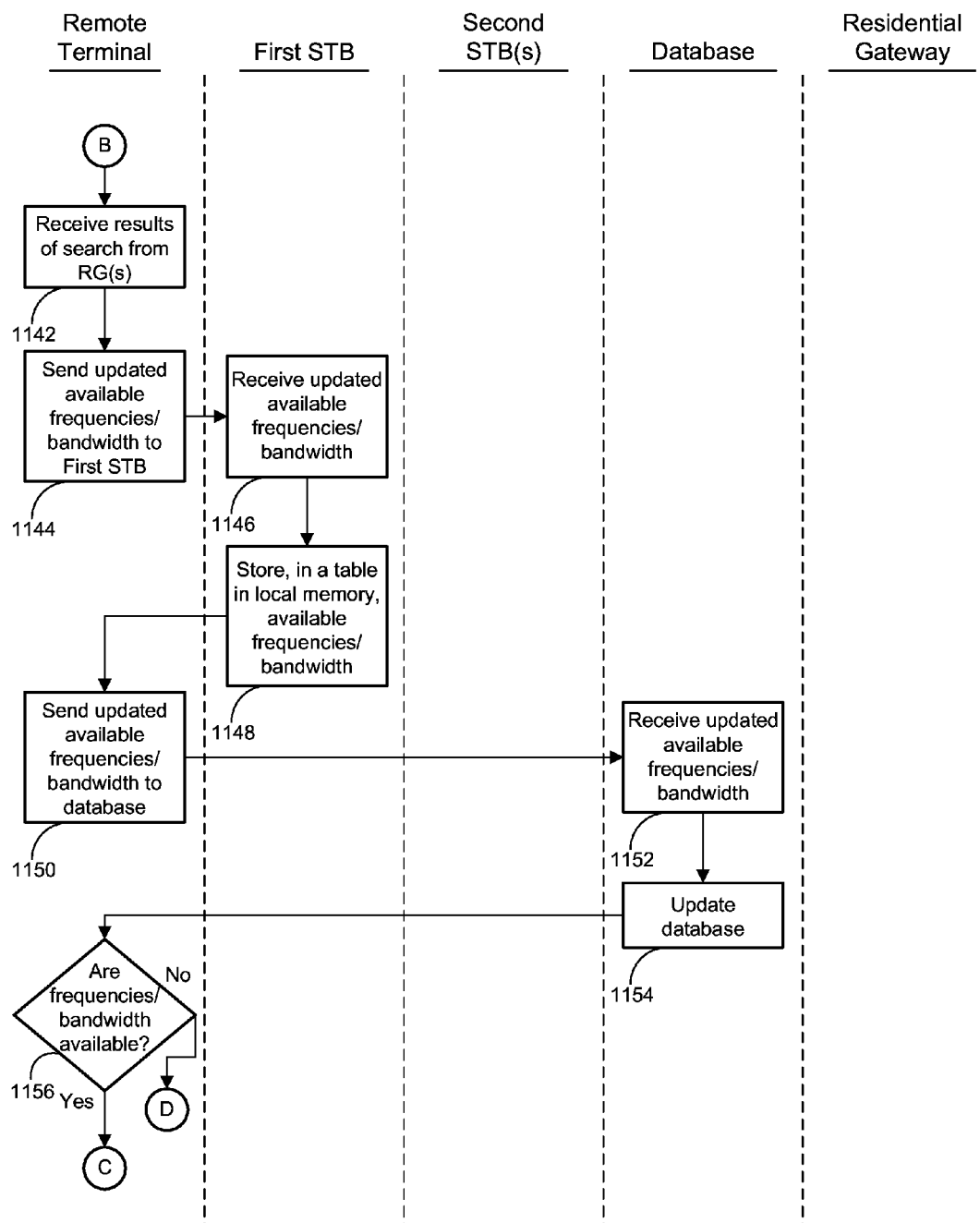

Continuing onto FIG. 11C, the remote terminal might receive results of the search from the residential gateway (block 1142), and might send updated information regarding the available frequencies and/or bandwidth to the database, which might receive the updated available frequencies and/or bandwidth information at block 1152. At block 1154, the database might update its local or associated memory with the updated information.

The remote terminal, at block 1140, might make a determination as to whether there are any available frequencies and/or bandwidth based on the updated information now stored in the table and updated in the database. If not, the process 1100 returns to block 1108. If so, the process 1100 continues to block 1158 in FIG. 11D.

Figure 11D:
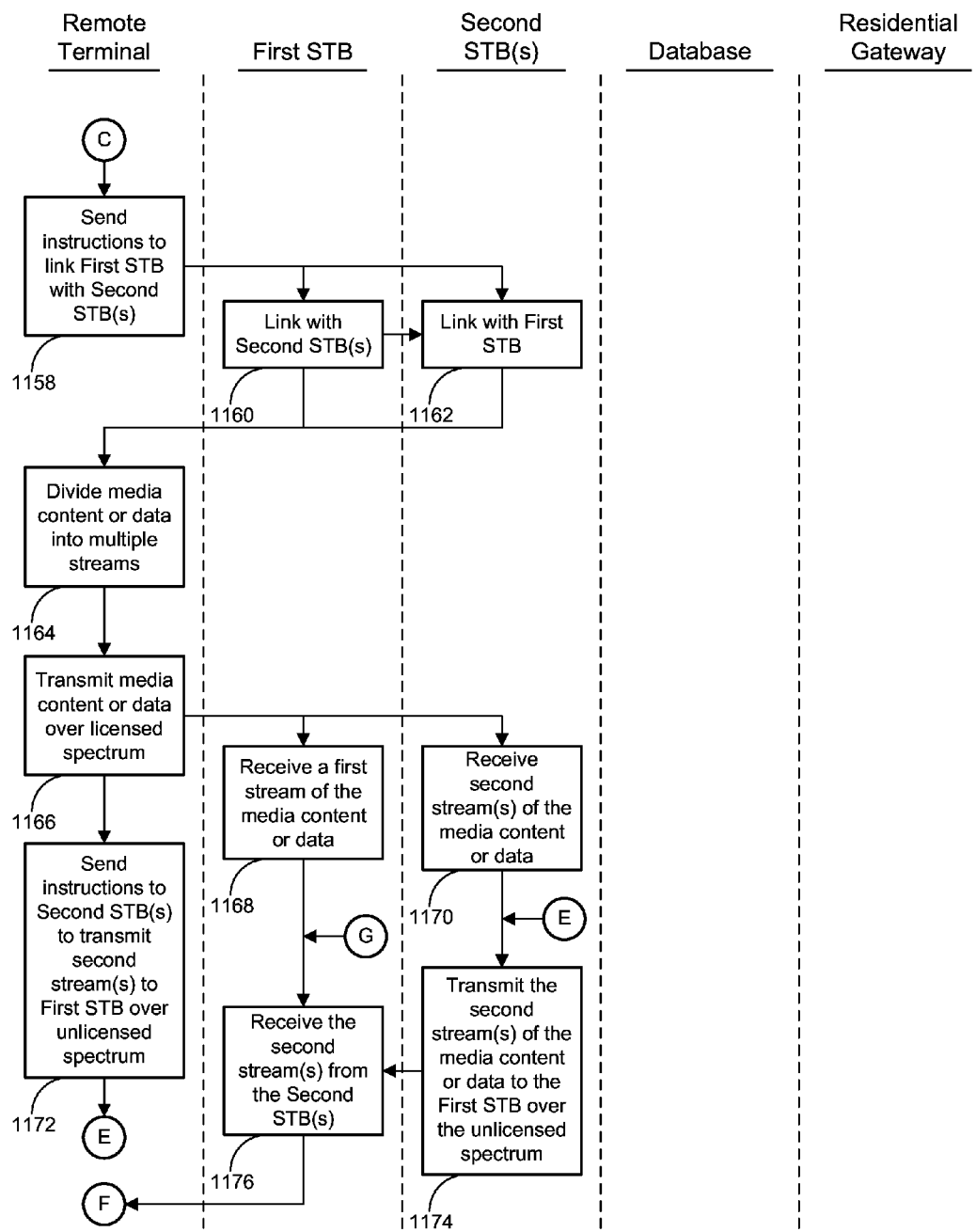

Continuing onto FIG. 11D, the remote terminal might send instructions to the first STB and the one or more second STBs having available frequencies and/or bandwidth to link with each other (block 1158). At blocks 1160 and 1162, the first STB might link with at least one of the one or more second STBs having the available frequencies and/or bandwidth, and vice versa. The remote terminal, at block 1164, might divide the media content or data into multiple streams, and might transmit, over the licensed spectrum, the media content or data (block 1166), a first stream of which might be received by the first STB (at block 1168), while a second, third, or more stream of which might be received by said at least one of the one or more second STBs having the available frequencies and/or bandwidth (at block 1170). The remote terminal, at block 1172, might send instructions to the one or more second STBs having the available frequencies and/or bandwidth to transmit the second, third, or more streams to the first STB over the unlicensed spectrum. At block 1174, the at least one of the one or more second STBs having the available frequencies and/or bandwidth might transmit the second, third, or more streams of the media content or data to the first STB over the unlicensed spectrum (either within the customer premises and/or between customer premises). The first STB might receive the second, third, or more streams of the media content or data from the at least one of the one or more second STBs having the available frequencies and/or bandwidth, at block 1176.

Figure 11E:
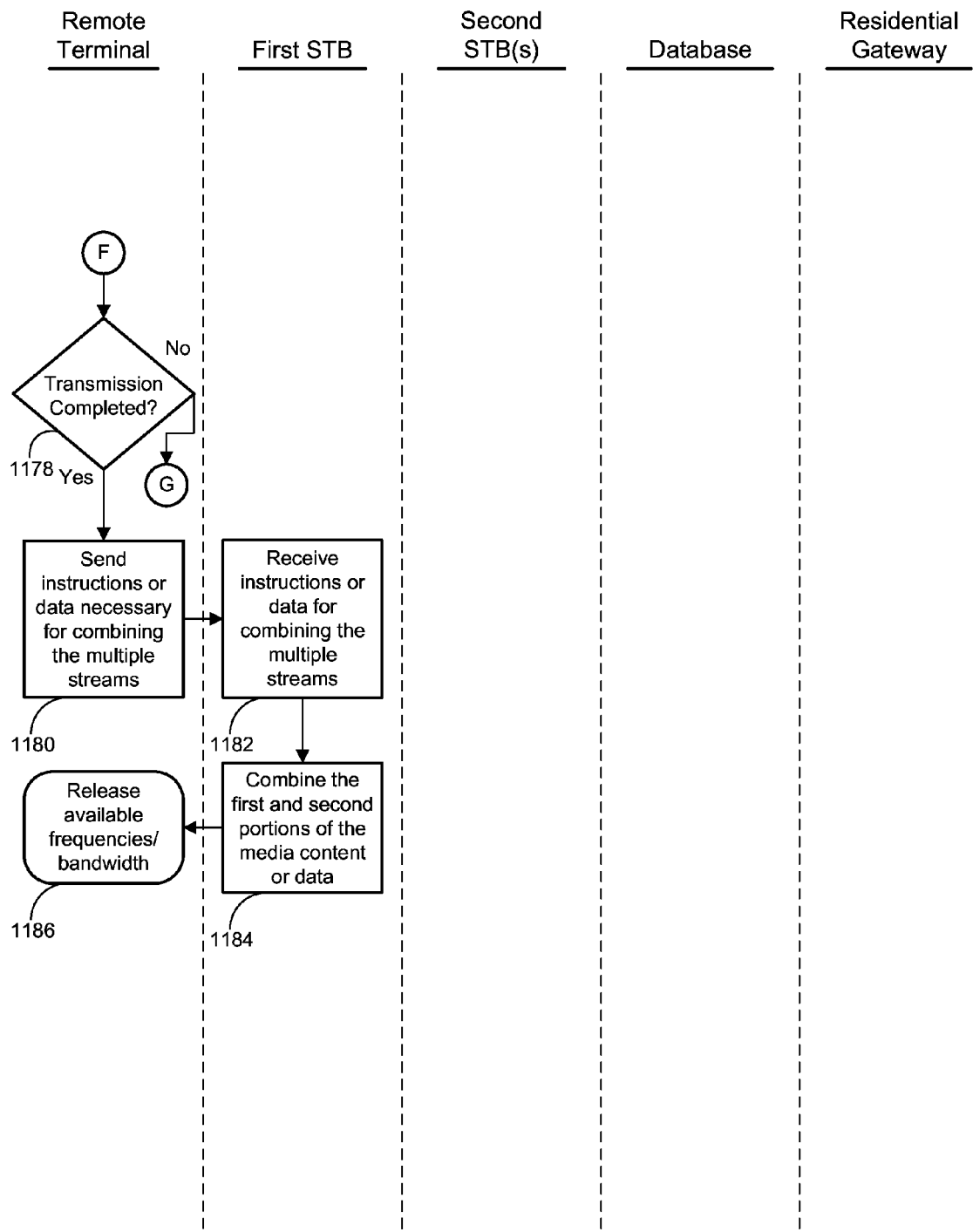

Continuing onto FIG. 11E, a determination might be made by the first STB as to whether streaming of the second, third, or more portions has been completed (block 1178). If not, the process 1100 returns to block 1176. If so, process 1100 continues to block 1180, at which the remote terminal might send instructions or data necessary for combining the multiple streams to the first STB over the licensed spectrum. At block 1182, the first STB might receive the instructions or data for combining the multiple streams, and might, at block 1184, combine the first and second, third, or more streams of the media content or data. The remote terminal might release the available frequencies and/or bandwidth, so that the available frequencies and/or bandwidth might be free for use for other purposes (block 1186).

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for providing media content to a plurality of set-top boxes over a licensed spectrum and over an unlicensed spectrum, the system comprising:
   a first set-top box ("STB") at a first customer premises, the first STB being one of a plurality of STBs at one or more customer premises, each of the plurality of STBs comprising a first transceiver configured to receive media content over the licensed spectrum and a second transceiver configured to send and receive media content over the unlicensed spectrum, the first STB configured to receive, at a first transceiver of the first STB, a first portion of media content over the licensed spectrum;
   a second STB of the plurality of STBs, the second STB configured to receive, at a first transceiver of the second STB, a second portion of the media content over the licensed spectrum, and configured to transmit, using a second transceiver of the second STB, the second portion of the media content to a second transceiver of the first STB over the unlicensed spectrum; and
   a remote terminal located at a service provider;
   wherein one of the first STB or the remote terminal is configured to:
      determine that additional bandwidth is required by the first STB to receive the media content;
      determine that two or more STBs of the plurality of STBs have available bandwidth;
      link the two or more STBs with the first STB, based on the determination that the two or more STBs of the plurality of STBs have available bandwidth;
   wherein the first STB is further configured to receive portions of the media content via the two or more STBs over the unlicensed spectrum; and
   wherein the one of the first STB or the remote terminal is further configured to, in response to a determination that transmission of the portions of the media content to the first STB over the unlicensed spectrum has been completed, release the available bandwidth of each of the two or more STBs.

2. The system of claim 1, wherein the media content includes content selected from a group consisting of video content, audio content, and data.

3. The system of claim 1, wherein the remote terminal is further configured to transmit the media content over the licensed spectrum, wherein the first portion and the second portion of the media content are transmitted to the respective first and second STBs from the remote terminal over the licensed spectrum.

4. The system of claim 3, further comprising one or more databases located in at least one of the first customer premises, any other of the one or more customer premises, or the service provider, the one or more databases having stored thereon available bandwidth of each of the plurality of STBs, the one or more databases being accessible by one or more of the plurality of STBs, wherein the available bandwidth comprises at least one of available frequency bandwidth, available network bandwidth, available data bandwidth, or available digital bandwidth.

5. The system of claim 4, wherein determining that two or more STBs of the plurality of STBs have available bandwidth comprises determining that two or more STBs of the plurality of STBs have available bandwidth, based on the available bandwidth of each of the plurality of STBs stored in the one or more databases.

6. The system of claim 4, wherein the remote terminal is further configured to:
   perform periodic queries of the plurality of STBs to determine whether each of the plurality of STBs has available bandwidth; and
   update the one or more databases, based on results of the periodic queries.

7. The system of claim 1, wherein the second STB is located at one of the first customer premises or a second customer premises of the one or more customer premises, the second customer premises being different from the first customer premises.

8. The system of claim 1, wherein at least one of the first STB, the second STB, or any other STB of the plurality of STBs comprises a memory on which is stored a table of available bandwidth of neighboring STBs among the plurality of STBs, wherein the available bandwidth comprises at least one of available frequency bandwidth, available network bandwidth, available data bandwidth, or available digital bandwidth.

9. The system of claim 1, wherein the first STB is unable to receive the second portion of the media content over the licensed spectrum due to signal loss, said signal loss comprising at least one of loss due to rain fade, loss due to storm interference, loss due to signal passing through precipitation, or loss due to telecommunications relay systems being down.

10. The system of claim 1, further comprising:
    a third STB of the plurality of STBs;
    wherein the second STB is further configured to transmit the second portion of the media content to the first STB over the unlicensed spectrum via the third STB; and
    wherein the third STB is configured to receive, at the second transceiver of the third STB, the second portion of the media content from the second STB over the unlicensed spectrum, and to perform a data pass-through of the second portion to the second transceiver of the first STB, using the second transceiver of the third STB, over the unlicensed spectrum.

11. The system of claim 1, further comprising:
    a fourth STB of the plurality of STBs, the fourth STB being located at a fourth customer premises different from the first customer premises, the fourth customer premises being in an out-of-service location; and
    a fifth STB of the plurality of STBs, the fifth STB being configured to receive, at the first transceiver of the fifth STB, the media content over the licensed spectrum, and to transmit, using the second transceiver of the fifth STB, the media content to the second transceiver of the fourth STB over the unlicensed spectrum.

12. A method for providing media content to a plurality of set-top boxes over a licensed spectrum and over an unlicensed spectrum, the method comprising:
    receiving, by a first set-top box ("STB") of a plurality of STBs, a first portion of media content from a remote terminal located at a service provider, said first STB being located at a first customer premises of one or more customer premises, each of the plurality of STBs comprising a first transceiver configured to receive media content over the licensed spectrum and a second transceiver configured to send and receive media content over the unlicensed spectrum, wherein the first STB receives the first portion of media content over the licensed spectrum using the first transceiver of the first STB;
    receiving, by the first STB, a second portion of the media content from a second STB of the plurality of STBs, wherein the first STB receives the second portion of media content using the second transceiver of the first STB over the unlicensed spectrum, and wherein the second STB receives the second portion of media content from the remote terminal over the licensed spectrum, and transmits the second portion of media content to the second transceiver of the first STB using the second transceiver of the second STB over the unlicensed spectrum; and determining, with one of the first STB or the remote terminal, that additional bandwidth is required by the first STB to receive the media content;

determining, with one of the first STB or the remote terminal, that two or more STBs of the plurality of STBs have available bandwidth;

linking, using one of the first STB or the remote terminal, the two or more STBs with the first STB, based on the determination that the two or more STBs of the plurality of STBs have available bandwidth;

receiving, by the first STB, portions of the media content via the two or more STBs over the unlicensed spectrum; and in response to a determination that reception of the portions of the media content from the two or more STBs over the unlicensed spectrum has been completed, releasing, using one of the first STB or the remote terminal, the available bandwidth of each of the two or more STBs.

13. The method of claim 12, wherein the media content includes content selected from a group consisting of video content, audio content, and data.

14. The method of claim 12, wherein the second STB is located at one of the first customer premises or a second customer premises of the one or more customer premises, the second customer premises being different from the first customer premises.

15. The method of claim 12, further comprising:
storing, by at least one of the first STB, the second STB, or any other of the plurality of STBs in a memory local to said at least one of the first STB, the second STB, or any other of the plurality of STBs, a table of available bandwidth of neighboring STBs among the plurality of STBs, wherein the available bandwidth comprises at least one of available frequency bandwidth, available network bandwidth, available data bandwidth, or available digital bandwidth.

16. The method of claim 12, wherein determining that two or more STBs of the plurality of STBs have available bandwidth comprises performing, using one of the first STB or the remote terminal, periodic queries of the plurality of STBs to determine whether each of the plurality of STBs has available bandwidth.

17. The method of claim 12, wherein receiving, by the first STB, the second portion of the media content from the second STB includes receiving the second portion or the media content from the second STB over the unlicensed spectrum via a third STB of the plurality of STBs performing a data-pass through of the media content from the second STB over the unlicensed spectrum.

18. A licensed and unlicensed spectrum set-top box, comprising:
 at least one processor;
 a first transceiver configured to receive media content over a licensed spectrum;
 a second transceiver configured to receive media content over an unlicensed spectrum; and
 a non-transitory computer readable medium in communication with the at least one processor, the computer readable medium having stored thereon computer software comprising a set of instructions that, when executed by the at least one processor, causes the set-top box to perform one or more functions, the set of instructions comprising:
  instructions to determine that additional bandwidth is required by the first STB to receive the media content;
  instructions to determine that two or more STBs of the plurality of STBs have available bandwidth;
  instructions to link the two or more STBs with the first STB, based on the determination that the two or more STBs of the plurality of STBs have available bandwidth;
  instructions to receive portions of the media content via the two or more STBs over the unlicensed spectrum; and
  instructions to, in response to a determination that transmission of the portions of the media content to the first STB over the unlicensed spectrum has been completed, release the available bandwidth of each of the two or more STBs.

19. The licensed and unlicensed spectrum set-top box of claim 18, further comprising:
a memory on which is stored a table of available bandwidth of a neighboring plurality of set-top boxes ("STBs"),
wherein the available bandwidth comprises at least one of available frequency bandwidth, available network bandwidth, available data bandwidth, or available digital bandwidth.

* * * * *